US008007362B2

(12) United States Patent  
Aoyama et al.

(10) Patent No.: US 8,007,362 B2  
(45) Date of Patent: Aug. 30, 2011

(54) METHOD OF DISPLAYING MULTIPLE KINDS OF INDEPENDENTLY PROCESSED DISPLAY DATA

(75) Inventors: Koji Aoyama, Kanagawa (JP); Mitsuteru Fukushima, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 1292 days.

(21) Appl. No.: 11/392,773

(22) Filed: Mar. 30, 2006

(65) Prior Publication Data

US 2006/0256135 A1    Nov. 16, 2006

(30) Foreign Application Priority Data

Mar. 31, 2005   (JP) ................................ P2005-103229

(51) Int. Cl.
  *A63F 9/24*   (2006.01)
  *A63F 13/00*  (2006.01)
  *G06F 17/00*  (2006.01)
  *G06F 19/00*  (2011.01)

(52) U.S. Cl. ......................................................... 463/34

(58) Field of Classification Search .................... 95/155; 395/113, 119, 120, 133, 135, 157, 158, 160, 395/161; 463/42

See application file for complete search history.

(56) References Cited

U.S. PATENT DOCUMENTS

| 4,532,540 A | 7/1985 | Wine |
| 5,522,025 A | 5/1996 | Rosenstein |
| 5,805,163 A | 9/1998 | Bagnas |
| 5,831,615 A * | 11/1998 | Drews et al. ................... 715/768 |
| 6,750,858 B1 | 6/2004 | Rosenstein |

FOREIGN PATENT DOCUMENTS

| JP | 4-361322 | 12/1992 |
| JP | 6-259217 | 9/1994 |
| JP | 9-504884 | 5/1997 |
| JP | 9-198125 | 7/1997 |
| JP | 10-214021 | 8/1998 |
| JP | 2000-20208 | 1/2000 |
| JP | 2001-325054 | 11/2001 |
| JP | 2003-50771 | 2/2003 |
| JP | 2003-050771 | 2/2003 |
| JP | 2003-219308 | 7/2003 |

(Continued)

OTHER PUBLICATIONS

Mastering Windows XP, publication date Nov. 11, 2004.*

(Continued)

*Primary Examiner* — David L Lewis  
*Assistant Examiner* — Reginald A Renwick  
(74) *Attorney, Agent, or Firm* — Greenblum & Bernstein, P.L.C.

(57) ABSTRACT

A terminal apparatus executes different kinds of network games provided by a server group. The user of the terminal apparatus can register other users who become acquainted with the user through network games in a friend list provided for each user. While the terminal device runs different game programs for different kinds of games, the terminal apparatus runs a common friend list program regardless of the game types. When the display of a game image is set to a window mode, the friend list program displays a friend list in a friend list window that is set separate from a game window. When the display of a game image is set to a full-screen mode, the friend list program displays a friend list synthesized with the game image in the form of a semi-transparent image.

17 Claims, 10 Drawing Sheets

FOREIGN PATENT DOCUMENTS

| | | |
|---|---|---|
| JP | 2003-295996 | 10/2003 |
| JP | 2006-4086 | 1/2006 |
| WO | 95/12194 | 5/1995 |

OTHER PUBLICATIONS

English Language Abstract of JP 2003-050771.
English language abstract of JP 2003-50771.
English language Abstract of JP 2000-20208.
English language Abstract of JP 9-504884.
English language Abstract of JP 2003-295996.
English language Abstract of JP 2006-4086.
English language Abstract of JP 9-198125.
English language Abstract of JP 2003-219308.
English language Abstract of JP 2001-325054.
English language Abstract of JP 6-259217.
English language Abstract of JP 4-361322.
English language Abstract of JP 10-214021.

* cited by examiner

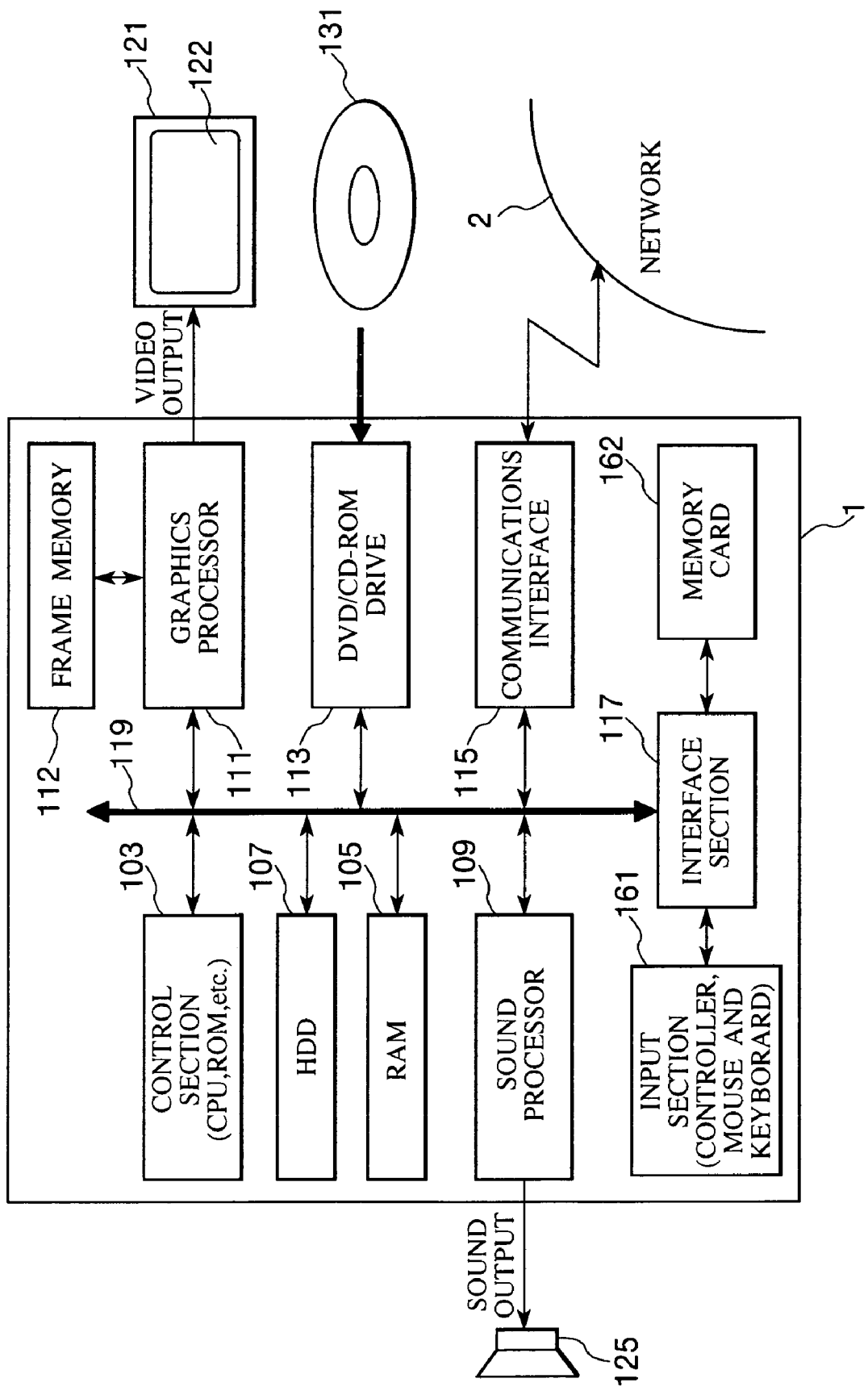

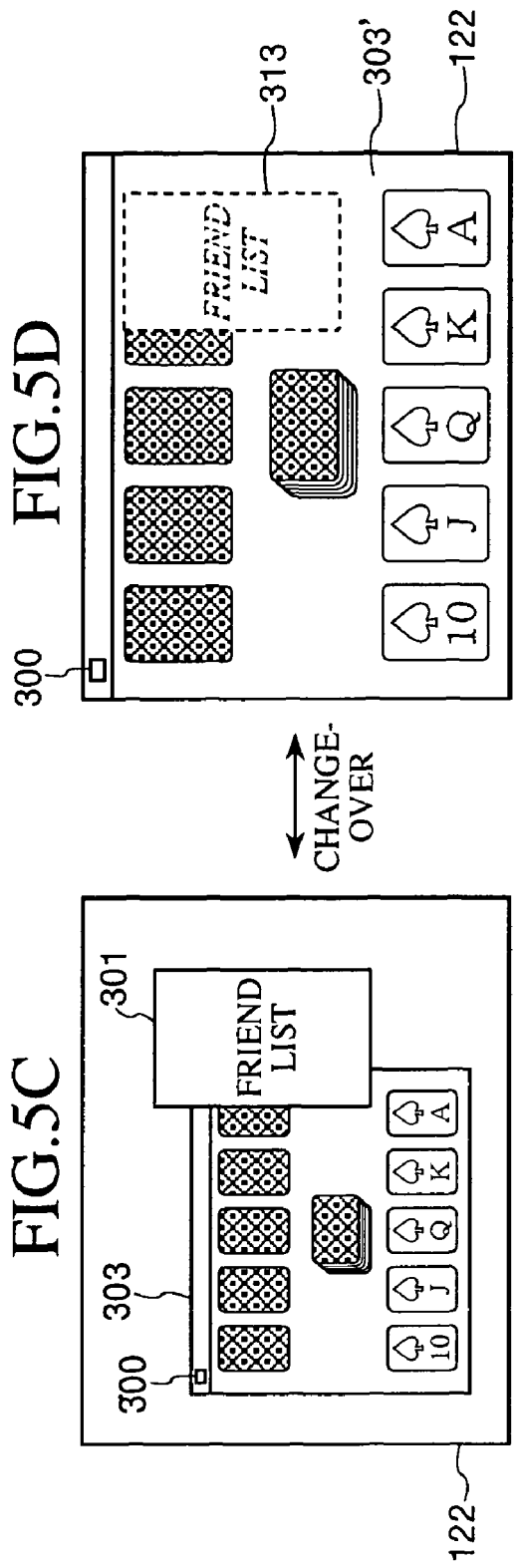

METHOD OF DISPLAYING MULTIPLE KINDS OF INDEPENDENTLY PROCESSED DISPLAY DATA

CROSS REFERENCE TO RELATED APPLICATION

The present disclosure relates to subject matter contained in Japanese Patent Application No. 2005-103229, filed on Mar. 31, 2005, the disclosure of which is expressly incorporated herein by reference in its entirety.

BACKGROUND OF THE INVENTION

1. Field of the Invention

The present invention relates to a display control method. More specifically, the present invention relates to displaying first and second display data which result from independent processing of first information and second information.

2. Description of the Related Art

A user's terminal apparatus is connected to a server apparatus over the Internet in a network game (online game). The server executes a process relating to the progress of the game based on information transmitted from the terminal apparatuses of the users, and transmits the processing result to the users' terminal apparatuses. Such a process mode of the network game permits each user participating in a game to progress the game in cooperation with other users. There is a user who wants to progress the game with other users with whom he/she has played the game in the past. Such a user may be eager to know information on the status of the other users.

Unexamined Japanese Patent Application KOKAI Publication No. 2003-50771 discloses a network game which provides a friend list function of providing information on other users registered previously by a user. The user of the network game can check whether other users registered as friends are online or offline, or are participating in the game, etc., by referring to the friend list. The user of the network game can ask another user to participate in the game based on the friend list.

The network game disclosed in Unexamined Japanese Patent Application KOKAI Publication No. 2003-50771 provides the function of displaying the friend list while the user plays the network game, as a partial function of a game program. The function of displaying the friend list while a messenger is being launched is likewise provided as a partial function of a messenger program.

FIG. 1 illustrates the module structure of a game program according to a conventional technology. If games differ from one another, game programs also differ from one another, so that a game-1 program 251 corresponding to a first game and a game-2 program 252 corresponding to a second game are prepared as programs which use the function of an operating system (OS) 200. The game-1 program 251 has a friend list module 251a for processing a friend list, and a drawing module 251b for drawing images of games and the friend list. The game-2 program 252, which is independent of the game-1 program 251, has a friend list module 252a and a drawing module 252b.

For example, the game-1 program 251 causes the friend list module 251a in that program to process the friend list and to transmit information on the result of processing the friend list together with information on the result of processing the first game to the drawing module 251b. The game-1 program 251 also causes the drawing module 251b to draw an image in a frame memory. The game-2 program 252 causes the friend list module 252a in that program to process the friend list and to transmit information on the result of processing the friend list together with information on the result of processing the second game to the drawing module 252b. The game-1 program 251 also causes the drawing module 252b to draw an image in the frame memory. The friend list modules 251a, 252a, which have basically the same function, must be prepared for the respective games.

Conventionally, in a case where a user refers to a friend list while playing a network game, the friend list appears to be displayed in a pop-up window different from the original image of the game, visually. Actually, the friend list is, however, merely displayed, as just a part of the image of the game, in front of the original image of the game. Therefore, as the game image is displayed in the window, not on a full screen but in a window display manner by the window display function of the OS 200, the display area of the friend list becomes relatively small. This makes it difficult for the user to see the friend list.

Technically, the friend list may be displayed on a window different from the game image. However, if the game image is displayed on a full screen when the window of the friend list is set behind the game image, the friend list cannot be seen. If the window of the friend list is set in front of the game image, the window of the friend list makes it difficult for the user to see the image of the game.

SUMMARY OF THE INVENTION

It is an object of the present invention to display second display data resulting from processing second information independently from first information on the same display apparatus that displays first display data resulting from processing the first information.

According to a first aspect of the invention, there is provided a data display control method of drawing an image according to results of independently processed first information and second information in a frame memory. The data display control method displays the drawn image on a display apparatus.

The data display control method processes the first information to generate first display data for displaying the result of processing the first information. The data display control method further processes the second information to generate second display data for displaying the result of processing the second information. The data display control method sets a first window for displaying an image of the first display data on the display apparatus. The data display control method further sets a second window for displaying an image of the second display data on the display apparatus. The data display control method draws the image of the first display data within a range in the frame memory corresponding to the first window.

The data display control method determines whether the second window is set to overlay the first window. The data display control method draws the image of the second display data within a range in the frame memory corresponding to the second window, when it is determined that the second window is not set to overlay the first window. The data display control method draws the image of the second display data synthesized with the image of the first display data within the range in the frame memory corresponding to the first window, when it is determined that the second window is set to overlay the first window. The data display control method reads out an image drawn in the frame memory, and outputs the read-out image to the display apparatus.

According to the data display control method, the first window is set for the first display data which is the result of processing first information, and the second window is set for the second display data which is the result of processing second information. When the first window is not set to overlay the second window, the first display data is drawn in the frame memory, and then the second display data is drawn in the frame memory too. The image of the first information and the image of the second information can be displayed on the display apparatus without overlying each other.

When the first window and the second window overlay each other, the first display data is drawn in the frame memory after which the second display data is drawn synthesized with the image of the first display data in the frame memory. The image of the second display data can be displayed together with the image of the first display data on the display apparatus. Regardless of whether the first window and the second window overlay each other, both the first display data and the second display data can always be displayed on the display apparatus.

According to a second aspect of the invention, there is provided a data display control apparatus which is connected to a display apparatus for displaying an image. The data display control apparatus has a frame memory where images according to results of independently processed first information and second information are drawn. The data display control apparatus displays the images drawn in the frame memory on the display apparatus.

The data display control apparatus includes a first-information generating unit which processes the first information, and generates first display data for displaying the result of processing the first information. The data display control apparatus further comprises a second-information generating unit which processes the second information, and generates second display data for displaying the result of processing the second information. The data display control apparatus further comprises a display controller which individually draws an image of the first display data and an image of the second display data in the frame memory, and displays the images on the display apparatus.

The display controller includes a first-window setting unit which sets a first window for displaying the first display data on the display apparatus. The display controller further includes a second-window setting unit which sets a second window for displaying the second display data on the display apparatus. The display controller further includes a first-display-data drawing unit which draws the image of the first display data within a range in the frame memory corresponding to the first window. The display controller further includes an overlay determining unit which determines whether the second window is set to overlay the first window. The display controller further includes a non-overlay-second-display-data drawing unit which draws the image of the second display data within a range in the frame memory corresponding to the second window when the overlay determining unit determines that the second window is not set to overlay the first window. The display controller further includes an overlay-second-display-data drawing unit which draws the image of the second display data synthesized with the image of the first display data in the frame memory within the range corresponding to the first window when the overlay determining unit determines that the second window is set to overlay the first window. The display controller further includes an image display controller which reads out an image drawn in the frame memory and displays the read-out image on the display apparatus.

According to a third aspect of the invention, there is provided a data display control apparatus which is connected to a display apparatus for displaying an image. The data display control apparatus has a frame memory where images according to results of independently processed first information and second information are drawn. The data display control apparatus displays the images drawn in the frame memory on the display apparatus.

The data display control apparatus comprises a first information processor which processes the first information, and draws an image of first display data obtained by processing the first information in the frame memory. The data display control apparatus further comprises a second information processor which processes the second information, and draws an image of second display data obtained by processing the second information in the frame memory. The data display control apparatus further comprises an image display controller which reads out an image drawn in the frame memory and displays the read-out image on the display apparatus.

The first information processor includes a first-window setting unit which sets a first window for displaying the first display data on the display apparatus. The first information processor further includes a first-display-data drawing unit which draws the image of the first display data within a range in the frame memory corresponding to the first window.

The second information processor includes a second-window setting unit which sets a second window for displaying the second display data on the display apparatus. The second information processor further includes an overlay determining unit which determines whether the second window is set to overlay the first window. The second information processor further includes a non-overlay-second-display-data drawing unit which draws the image of the second display data within a range in the frame memory corresponding to the second window when the overlay determining unit determines that the second window is not set to overlay the first window. The second information processor further includes a second-display-data forwarding unit which forwards the second display data to the first information processor when the overlay determining unit determines that the second window is set to overlay the first window.

The first information processor further includes an overlay-second-display-data drawing unit which draws the image of the second display data synthesized with the image of the first display data in the frame memory within the range corresponding to the first window when the second display data is received from the second-display-data forwarding unit.

According to a fourth aspect of the invention, there is provided a data display control apparatus which is connected to a display apparatus for displaying an image. The data display control apparatus has a frame memory where images according to results of independently processed first information and second information are drawn. The data display control apparatus displays the images drawn in the frame memory on the display apparatus.

The data display control apparatus includes a first information processor which processes the first information, and draws an image of first display data obtained by processing the first information in the frame memory. The data display control apparatus further comprises a second information processor which processes the second information, and draws an image of second display data obtained by processing the second information in the frame memory. The data display control apparatus further comprises an image display controller which reads out an image drawn in the frame memory and displays the read-out image on the display apparatus.

The first information processor includes a first-window setting unit which sets a first window for displaying the first display data on the display apparatus. The first information processor further includes a first-display-data drawing unit which draws the image of the first display data within the range in the frame memory corresponding to the first window.

The second information processor includes a second-window setting unit which sets a second window for displaying the second display data on the display apparatus. The second information processor further includes an overlay determining unit which determines whether the second window is set to overlay the first window. The second information processor further includes a non-overlay-second-display-data drawing unit which draws the image of the second display data within a range in the frame memory corresponding to the second window when the overlay determining unit determines that the second window is not set to overlay the first window. The second information processor further includes an overlay-second-display-data drawing unit which draws the image of the second display data synthesized with the image of the first display data in the frame memory within a range corresponding to the first window when the overlay determining unit determines that the second window is set to overlay the first window.

The functions of the individual components constituting each of the data display control apparatuses according to the second to fourth aspects may be achieved in cooperation with an operating system. In a multiprocessor system, the functions of the individual components of the data display control apparatus may be achieved by one processor requesting other processors to perform the associated processes.

According to a fifth aspect of the invention, there is provided a data display control apparatus which is connected to a display apparatus for displaying an image. The data display control apparatus comprises a program memory for storing a program, a processor for executing the program, and a frame memory for drawing images according to results of independently processed first information and second information. The data display control apparatus displays an image drawn in the frame memory on the display apparatus.

The program includes a first-display-data generating code section which processes the first information to generate first display data for displaying the result of processing the first information. The program further includes a second-display-data generating code section which processes the second information to generate second display data for displaying the result of processing the second information. The program further includes a first-window setting code section which sets a first window for displaying an image of the first display data on the display apparatus. The program further includes a second-window setting code section which sets a second window for displaying an image of the second display data on the display apparatus. The program further includes a first-display-data image drawing code section which draws the image of the first display data within a range in the frame memory corresponding to the first window. The program further includes a determining code section which determines whether the second window is set to overlay the first window. The program further includes a second-display-data image drawing code section which draws the image of the second display data within a range in the frame memory corresponding to the second window, when it is determined that the second window is not set to overlay the first window. The program further includes a second-display-data image synthesizing and drawing code section which draws the image of the second display data synthesized with the image of the first display data within the range in the frame memory corresponding to the first window, when it is determined that the second window is set to overlay the first window. The program further includes an outputting code section which reads out an image drawn in the frame memory, and outputs the read-out image to the display apparatus.

The program which is stored in the program memory in the data display control apparatus according to the fifth aspect can be provided in the form of a computer readable recording medium where the program is recorded. The computer readable recording medium may be constructed in such a way as to be loaded to and removed from a computer apparatus, and may be provided separate from the computer apparatus. The computer readable recording medium may be a fixed disk drive or the like which is installed inside a computer apparatus and is provided together with the computer apparatus. The program which is stored in the program memory in the data display control apparatus according to the fifth aspect can have its data signals superimposed on a carrier wave, and distributed over a network from another server unit located on the network.

BRIEF DESCRIPTION OF THE DRAWINGS

FIG. 3 is a block diagram illustrating the structure of a terminal apparatus according to an embodiment of the invention;

FIGS. 5A to 5D are diagrams illustrating examples of display screens of a game and a friend list according to an embodiment of the invention;

DETAILED DESCRIPTION OF THE PREFERRED EMBODIMENTS

Embodiments of the invention will be explained with reference to the accompanying drawings.

Figure 2:
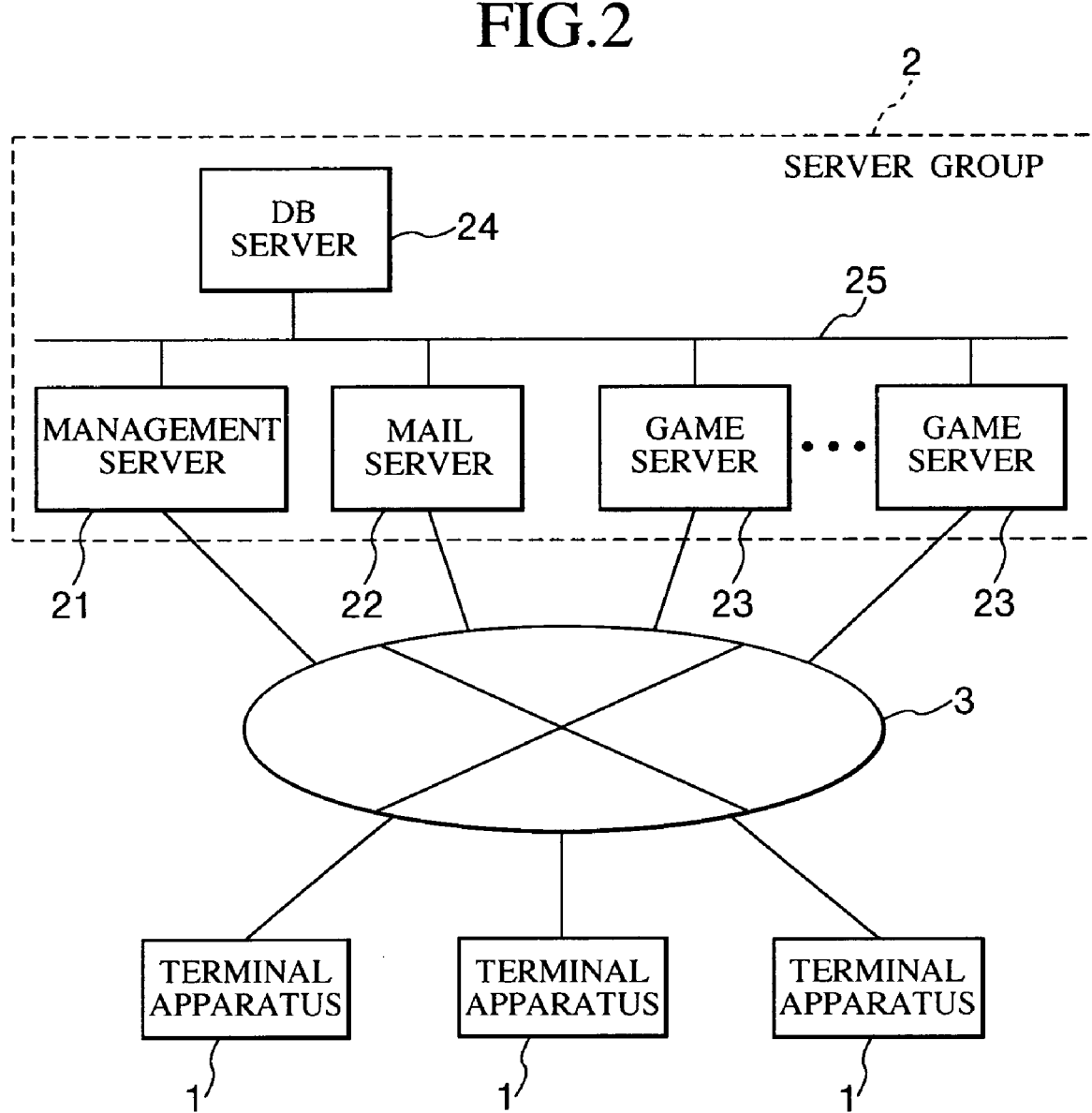
FIG. 2 is a block diagram illustrating the structure of a network game system according to an embodiment of the invention.

FIG. 2 is a block diagram illustrating an overall structure of a network system. As illustrated in the diagram, the network system is constituted in such a way that multiple terminal apparatuses 1 are connected to a server group 2 over the Internet 3. The server group 2 includes a management server 21, a mail server 22, game servers 23, and a database server 24 all connected together over an LAN (Local Area Network) 25. The servers 21 to 23 are connected to the terminal apparatuses 1 over the Internet 3.

Services provided by the server group 2 are for members only, and only users registered beforehand can use the services. The services provided by the server group 2 include a network game service and a mail exchange service. Registered users may be simply called "users" below. Each of the terminal apparatuses 1 is a client terminal used by a user for receiving the services provided by the server group 2. A general-purpose computer or a video game machine with a function of accessing the Internet may be used as the terminal apparatus 1. The structure of the terminal apparatus 1 will be discussed later in detail.

The management server 21 executes a process of registering users as members, a process of verifying a registered user, and the like. An account (user ID) and a password are given to a registered user. The user registers a handle name as a tentative name to be used at the time of receiving the services provided by the server group 2. The management server 21 manages accounts, passwords, and handle names of individual users. The management server 21 manages the connection statuses (online/offline) of the users, and the addresses of the users who are online.

The management server 21 manages services which are used by the individual users, and profiles of the individual users. Management of the profiles is carried out account by account, and includes management of a friend list. The friend list registers information on other users with whom the individual users want to exchange a message account by account. The friend list is prepared in the management server 21 beforehand through the registration of the user. At the time of the registration of the user, the information on other users is not registered in the friend list. The user can register information on other users met through the network game in the friend list. The user can also erase the information on other users registered in the friend list.

The mail server 22 provides the user with a mail exchange service. Each of the game servers 23 provides the user with network game service. Each of the game servers 23 provides one kind of network games. Multiple game servers 23 may provide network games of the same kind. Network games of the same kind provided by the different game servers 23 are distinguished from one another with a concept called "world". The database server 24 manages data shared by the individual servers 21 to 23 of the server group 2.

FIG. 3 is a block diagram illustrating the structure of an exemplary terminal apparatus 1 to which a video game machine is adapted. A general-purpose computer which realizes the same function as that of the video game machine may also be applied to the terminal apparatus 1. As illustrated in FIG. 3, the terminal apparatus 1 to which the video game machine is adapted comprises a control section 103, an RAM (Random Access Memory)-105, a hard disk drive (HDD) 107, a sound processor 109, a graphics processor 111, a DVD/CD-ROM drive 113, a communications interface 115, and an interface section 117 all connected to an internal bus 119.

The sound processor 109 is connected to a sound outputting device 125 which is a speaker. The graphics processor 111 is connected to a display apparatus 121 having a display screen 122. A recording medium (DVD-ROM or CD-ROM) 131 is loadable into the DVD/CD-ROM drive 113. The communications interface 115 is connected to a network (the Internet 3 in this embodiment). An input section 161 and a memory card 162 are connected to the interface section 117.

The control section 103 includes a CPU (Central Processing Unit), an ROM (Read Only Memory), and executes programs stored in the HDD 107 or the recording medium 131, thereby controlling the terminal apparatus 1. The control section 103 has an internal timer. An Operating System (OS) program is stored in the ROM of the control section 103. A game program and a friend list program to be discussed later process input information, and draw and display an image in cooperation with the OS program.

The RAM 105 is a work area for the control section 103. The HDD 107 is a storage area for storing a program and data. The program stored in this area is transferred to the RAM 105 when it is run. The program stored in the recording medium 131 is also transferred to the RAM 105 when it is run. When the program executed by the control section 103 issues an instruction to output a sound, the sound processor 109 interprets the instruction, and outputs a sound signal to the sound outputting device 125.

The graphics processor 111 draws an image in a frame memory 112 based on a drawing instruction output from the control section 103, and outputs a video signal for displaying an image on the display screen 122 of the display apparatus 121. Drawing an image in the frame memory 112 means developing image data in individual pixels of the frame memory 112. One frame period of an image included in a video signal output from the graphics processor 111 is set to, for example, 1/30 second. The frame memory 112 is prepared for two frames; one for drawing an image and the other for reading out an image. The two frame memories are alternatively switched from one to the other every frame period.

The control section 103 passes information which can specify an image to be drawn to the graphics processor 111 when outputting a drawing instruction. The graphics processor 111 processes the information given from the control section 103, and draws an image in the frame memory 112. The control section 103 generates information which can specify the image to be drawn, and outputs the drawing instruction to the graphics processor 111. The graphics processor 111 just draws an image corresponding to information given together with the drawing instruction. A process of drawing an image in the frame memory 112 may be explained as a process of the control section 103 in the following explanation.

The DVD/CD-ROM drive 113 reads out and writes a program and data from and to the recording medium 131. The communications interface 115 is connected to the network (the Internet 3), and communicates with other computers. The interface section 117 outputs input data from the input section 161 and stores the data in an input information register provided in the RAM 105. The control section 103 interprets the input data stored in the input information register and executes an arithmetic operation. The interface section 117 saves data, representing the progress of the game stored in the RAM 105, in the memory card 162 based on an instruction from the control section 103, reads out data of an interrupted game saved in the memory card 162, and transfers the read-out data to the RAM 105.

The input section 161 has a control pad having directional keys and multiple operations buttons, a mouse for inputting coordinates on the display screen 122, and a keyboard for inputting texts. The directional keys of the control pad are used for moving a player character and a cursor in a game when manipulated by the user. The operating buttons of the control pad are used for inputting instructions desired by the user, such as an instruction for action which should be taken by the player character, and an instruction for settling selection made by the user with an item at which the cursor is displayed.

The program and data for executing the game and mail exchange at the terminal apparatus 1 are stored in the recording medium 131 at first. The program and data are read out by the DVD/CD-ROM drive 113, and are loaded into the RAM 105 at the time of execution. The control section 103 processes the program and data loaded in the RAM 105, outputs a drawing instruction to the graphics processor 111, and outputs an instruction of outputting a sound to the sound processor 109. Intermediate data during execution of a process by the control section 103 is stored in the RAM 105.

When the network game system according to an embodiment is used, the terminal apparatus 1 is connected to the server group 2 over the Internet 3. A first game and a second game are provided as the network games that the users can play in an embodiment. Because the management server 21 manages a friend list for each user, the same friend list is used when the user is playing not only the first game but also the second game. The terminal apparatus 1 receives the friend list from the server group 2 in accordance with an instruction from the user, and displays the friend list on the display screen 122. The first game, the second game, and the friend list are respectively processed by separate programs at the terminal apparatus 1.

Figure 1:
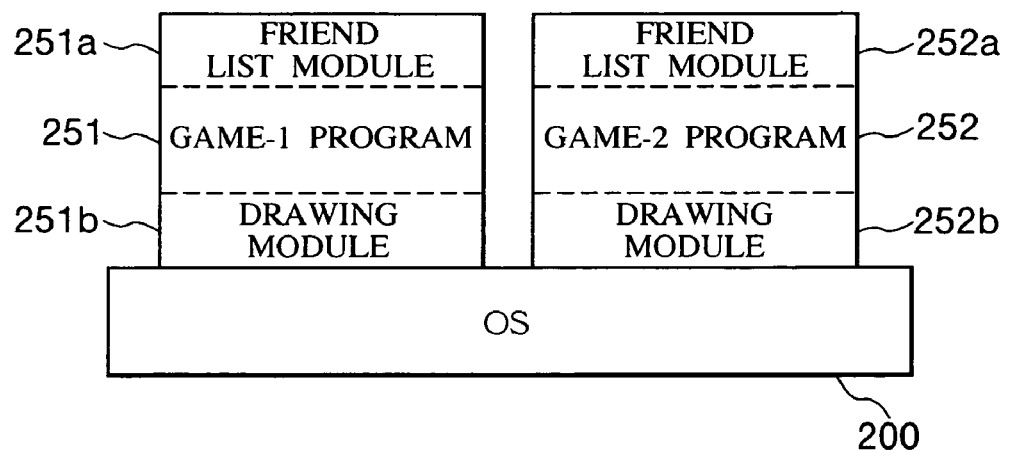
FIG. 1 is a diagram illustrating module structures of game programs according to a conventional technology.
Figure 4:
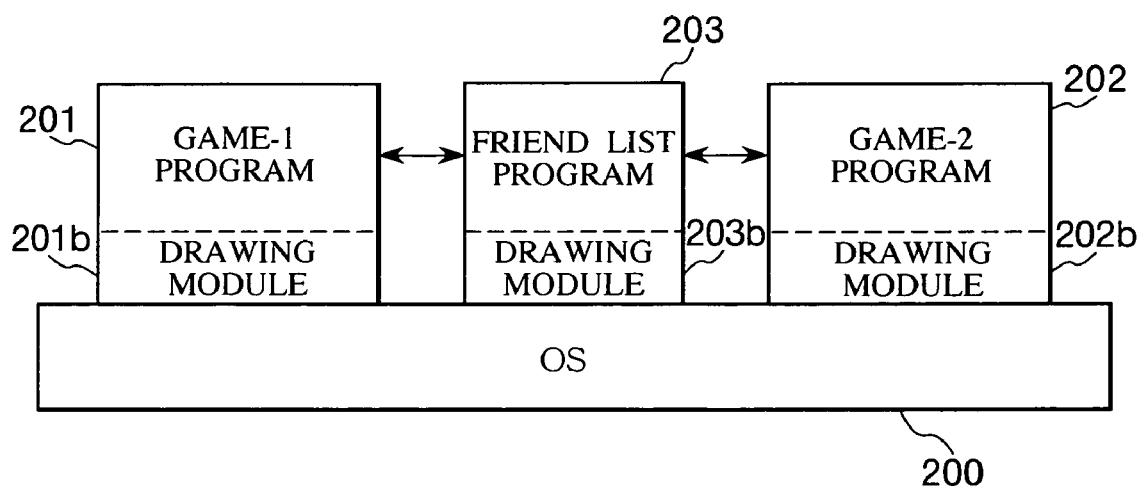
FIG. 4 is a diagram illustrating module structures of game programs and a friend list program according to an embodiment of the invention.

FIG. 4 is a diagram illustrating the structures of the programs to be executed by the terminal apparatus 1 in an embodiment of the present invention. As illustrated in FIG. 4, a game-1 program 201 for executing the first game, a game-2 program 202 for executing the second game, and in addition, a friend list program 203 for processing a friend list are provided as programs to be executed using the functions of the OS 200. The game-1 program 201 and the friend list program 203, can call each other. The game-2 program 202 and the friend list program 203 can likewise call each other. The technique of interprocess communication, for example, is used for the programs to call each other.

The game-1 program 201 and the game-2 program 203 do not have a module for processing the friend list. The game-1 program 201 and the game-2 program 202 causes the friend list program 203 to process the friend list. The game-1 program 201 and the game-2 program 202 respectively have unique drawing modules 201*b* and 202*b*, and the friend list program 203 likewise has an unique drawing module 203*b*. The drawing modules 201*b*, 202*b*, and 203*b* output drawing instructions to the graphics processor 111 to draw images in the frame memory 112 in cooperation with the OS 200.

The drawing module 203*b* of the friend list program 203 serves merely to display the friend list in a window on the display screen 122 when an image of a game is displayed in a window. The drawing modules 201*b* and 202*b* of the game-1 program 201 and the game-2 program 202 can display an image of a game on the display screen 122 both in a window mode and a full-screen mode.

When the control section 103 executes the drawing modules 201*b* and 202*b* to display an image of a game in a full-screen mode, the image of the friend list is drawn synthesized with the game image in the frame memory 112. The drawing module 203*b* of the friend list program 203 synthesizes the image of the friend list in a mode according to the game in play. The image of the friend list displayed overlying the image of the first game slightly differs from the image of the friend list displayed overlying the image of the second game. The user can selectively set the display mode of a game image to the window mode for window display or the full-screen mode for full-screen display for both the first game and second game by operating the input section 161. Information on the display mode of a game image is stored in the RAM 105.

An explanation will be given of a method for drawing a game image and the image of the friend list in a case where the first game is the network game to be executed by the terminal apparatus 1, as an example. Drawing images in the frame memory 112 is carried out in every frame period in which the image of the first game is drawn first in the frame memory. In one frame period, the control section 103 executes the drawing module 201*b*, draws a frame according to the display mode in the frame memory 112, and draws an image according to the game execution mode within the frame in the frame memory 112.

The control section 103 passes information of a friend list area, the transparency of a semi-transparent image at the time of drawing the friend list, information on a font and color of text to the friend list program 203 from the game-1 program 201 in execution, and calls the friend list program 203. The transparency of the semi-transparent image at the time of drawing the friend list is decided in accordance with the display status of the game image. The font and text color of the friend list are preset for the first game, and stored in the RAM 105 as a part of the game-1 program 201.

As the friend list program 203 is called, the control section 103 executes the drawing module 203*b*, and checks whether the display mode of the image of the first game is the window mode or the full-screen mode. When the display mode of the image of the first game is the window mode, the control section 103 further executes the drawing module 203*b* to draw the window frame of the friend list in the frame memory 112 in an overwriting manner, and draws the image of the friend list within the window frame of the friend list in the frame memory 112 in an overwriting manner.

When the display mode of the image of the first game is the full-screen mode, the control section 103 further executes the drawing module 203*b*, and draws the image of the friend list within that range in the frame memory 112 which corresponds to the friend list area passed from the game-1 program 201. At this time, the font and text color of the friend list are converted into the font and text color passed from the game-1 program 201. The transparency of the image of the friend list is set to the transparency of the semi-transparent image passed from the game-1 program 201. The image of the friend list is drawn synthesized with the game image as a semi-transparent image. In the full-screen mode, the image of the window frame of the friend list is not drawn in the frame memory 112.

An explanation will be given of examples of display screens of both the network game and the friend list. FIGS. 5A to 5D are diagrams illustrating the examples of display screens of a game and the friend list. FIGS. 5A and 5B illustrate examples of display screens when the first game (competitive fighting game) is executed. FIGS. 5C and 5D illustrate examples of display screens when the second game (poker game) is executed. FIGS. 5A and 5C illustrate examples of the display screens when the display mode of a game image is the window mode. FIGS. 5B and 5D illustrate examples of the display screens when the display mode of a game image is the full-screen mode.

As illustrated in FIGS. 5A and 5C, when the display mode of a game image is the window mode, a friend list window 301 and game windows 302 and 303 are displayed on the display screen 122. The images of the first game and second game are displayed within game windows 302 and 303, respectively. The image of the friend list is displayed within the area of the friend list window 301 provided separately from the game windows 302 and 303. The fonts and text colors of the friend lists drawn in the friend window list 301 in FIG. 5A are the same as those in FIG. 5C, regardless of the kind of the game in play because information on the font and the text color are not passed from the game-1 program 201 nor the game-2 program 202.

The display position of the friend list window 301, as well as the display positions of the game windows 302 and 303 can be moved by, for example, dragging a mouse constituting the input section 161. The sizes of the game windows 302 and 303 can be changed by dragging the mouse, the size of the friend list window 301 cannot be changed in one embodiment. The user can instruct switching of the display mode from the window mode to the full-screen mode by clicking a display changeover button 300 located on the upper left of the game window 302, 303 with the mouse.

As illustrated in FIGS. 5B and 5D, when the display mode of the game image is the full-screen mode, the image of the first game or the second game is displayed across the entire display screen 122. The full-screen mode is substantively the same as the game window 302' or 303' being set across the entire display screen 122. The image of the friend list is displayed in a friend list area 312 or 313 set at a predetermined position in the display screen 122 (a predetermined position in the display area of a game image because the game image is displayed across the entire display screen 122). The friend list window for displaying the friend list is not set separately. The size of the friend list area 312, 313 cannot be changed in one embodiment.

The font and text color of the friend list displayed in the friend list area 312 for the first game differ from those of the friend list displayed in the friend list area 313 for the second game. Even if both friend lists have the same contents, they can differ from each other in fonts and text colors. This is because that the drawing modules 201b and 202b of the game-1 program 201 and game-2 program 202 request the friend list program 202 to change the font and text color of the friend list to the font and text color uniquely set for the respective games.

The image of the friend list, displayed in the friend list area 312, 313 when the image of the first game or the second game is displayed in the full-screen mode, is not displayed overwriting the image of the first game or the second gamed, but is displayed synthesized with the game image as a semi-transparent image. The transparency at the time of synthesizing the image of the friend list is passed to the friend list program 203 from the game-1 program 201 or the game-2 program 202 in accordance with the display status of the image of the first game or the second game.

FIGS. 5B and 5D illustrate the friend list areas 312 and 313 showing only the friend lists, and no game images, but because the images of the friend lists are drawn over the images of the games as the semi-transparent images, the friend lists 312 and 313 actually show non-illustrated portions of the game images.

The user can optionally add and/or delete other users as friends to and/or from the friend list. The user can register desirable information on other users registered as the friends on the friend list, in addition to, for example, handle names. Because text input is required for processing the friend list, a text input cursor is set at the friend list. If text input is required when the users exchange information on the game, the text input cursor is set at the screens of the first game and second game.

Processes in the network game system according to an embodiment will now be explained. In the network game system of an embodiment, to participate in a network game, the user accesses the server group 2 from the terminal apparatus 1, and be verified based on the account and password of the user. As the verification process does not directly relate to the invention, the detailed explanation of the authentication will be omitted. The following explanation will be given of the process in the network game system of an embodiment on the premise that the user has already been verified. As a process of progressing the network game, and a process which allows the user to register/delete other users in/from the friend list also do not relate to the invention, and are carried out in the same way as the conventional processes, their detailed explanations will be omitted.

Figure 6:
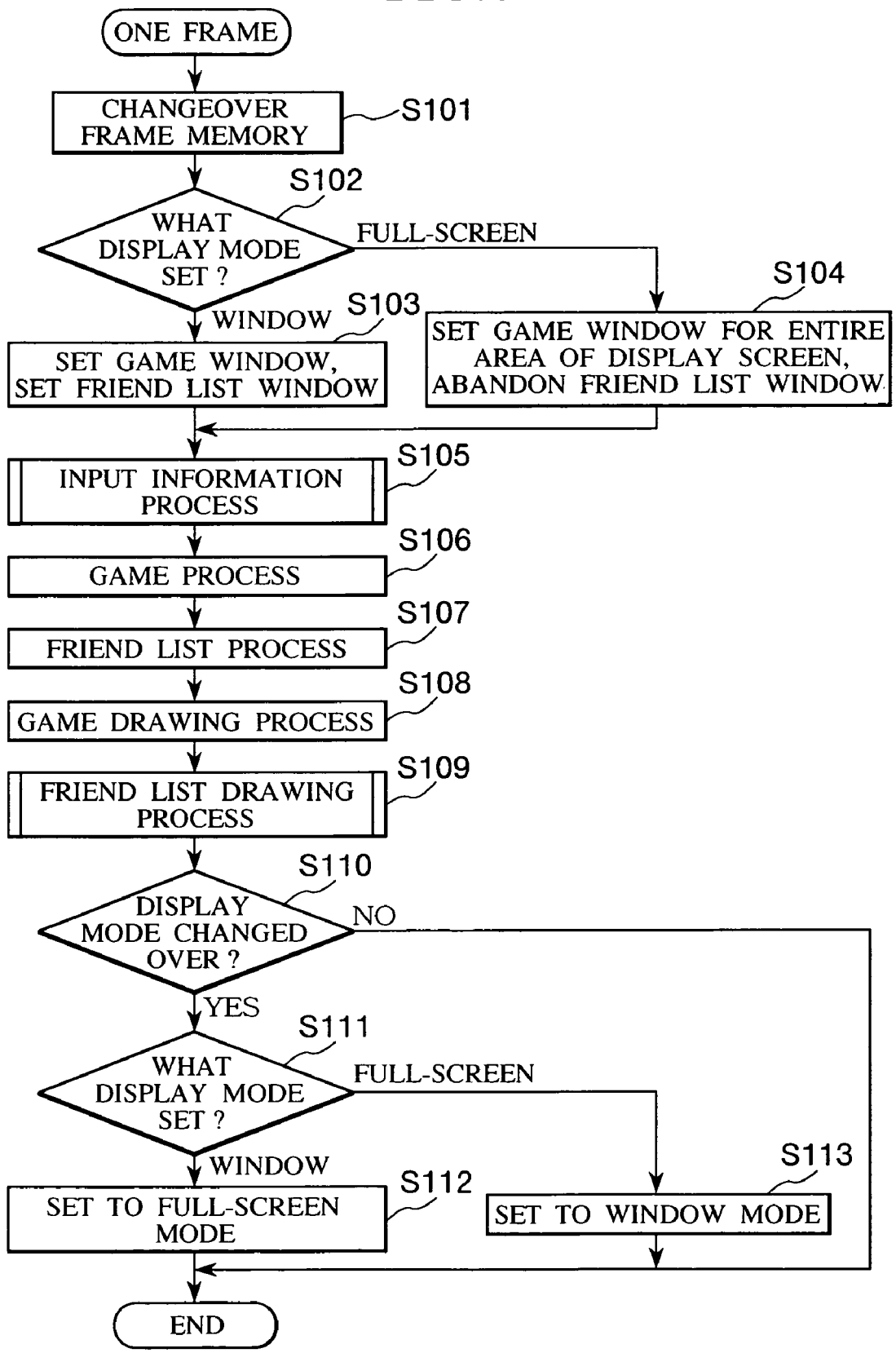
FIG. 6 is a flowchart illustrating processes to be executed every frame period by a controller of the terminal apparatus according to an embodiment of the invention.

FIG. 6 is a flowchart illustrating a process to be executed by the terminal apparatus 1 every frame period in the network game system of an embodiment. The processes in the flowchart are executed on the premise that the game-1 program 201 and the friend list program 203 have already been launched, and information on the display position and display mode of the game window 302 (in case of the full-screen window mode, information on the display position of the game window 302 in the window mode before changeover is included) and information on the display position of the friend list window 301 are stored in the RAM 105.

Input data from the input section 161 and a message received by the communications interface 115 from the server group 2 are written in the input information register of the RAM 105 by another process routine which is executed in parallel with the process in FIG. 6. Input information, such as the input data and the message written in the input information register, are retrieved in the game-1 program 201 or the friend list program 203 in an input information process to be discussed later.

As one frame period starts, the control section 103 executes the game-1 program 201 to respectively change over the frame memory 112 for drawing in the previous frame period and the frame memory 112 for readout in the previous frame period to the frame memory 112 for readout at the current frame period and the frame memory 112 for drawing at the current frame period (step S101). The graphics processor 111 sequentially reads out images drawn at the previous frame period from the changed-over frame memory 112 for readout, generates video signals, and outputs the generated video signals to the display apparatus 121. The control section 103 refers to the RAM 105, and determines whether the display mode of the image of the game is set in the window mode or the full-screen mode (step S1102).

If the window mode is set, the control section 103 checks whether or not information on the display of the game window 302 (information on the display position and the display status of a window frame) has been passed as input information to the game-1 program 201. If the information on the display of the game window 302 has been passed as the input information, the control section 103 updates the information on the display of the game window 302 stored in the RAM 105. The control section 103 stores the display data on the display position and display status of the window frame of the game window 302 in the RAM 105 beside the information on the display of the game window 302.

The control section 103 calls up the friend list program 203 from the game-1 program 201, and checks whether or not information on the display of the friend list window 301 (information on the display position of a window frame) has been passed as input information to the friend list program 203. If the information on the display of the friend list window 301 has been passed as input information, the control section 103 updates the information on the display of the friend list window 301 stored in the RAM 105. The control section 103 stores the display data on the display position of the window frame of the friend list window 301 in the RAM 105 beside the information on the display of the friend list 301 (step S103). After the process is returned to the game-1 program 201 from the friend list program 203, the process proceeds to step S105.

If the full-screen mode is set, the control section 103 checks whether or not information on a frame for full-screen display (which may be called as a game window for the sake of convenience) as input information has been passed to the game-1 program 201. If the information on the display window has been passed, the control section 103 updates the information on the game window stored in the RAM 105. The control section 103 stores display data on the display status of the window frame in the RAM 105 beside the information on the game window. At this time, the control section 103 does not store any display data on the friend list window 301 in the RAM 105 in accordance with the information on the display of the friend list window 301 (step S104). The process proceeds to step S105.

At step S105, the control section 103 executes an input information process to be discussed later in detail to separate input information for the game-1 program 201 from input information for the friend list program 203, and respectively to pass the information to the game-1 program 201, and the friend list program 203.

The control section 103 executes various processes for progressing the game in accordance with the input information passed to the game-1 program 201 and processing results up to the previous frame, and stores display data on the display of the game obtained from processing results, in the RAM 105 (step S106). Because this process is the same as a process for progressing a game in a conventional network game, its detailed explanation will be omitted.

The control section 103 calls the friend list program 203 from the game-1 program 201, executes various processes for displaying the friend list in accordance with the input information passed to the friend list program 203 and processing results up to the previous frame, and stores display data on the display of the friend list obtained from processing results in the RAM 105. In a case where a coordinate position corresponding to a text input area in the friend list is entered as input information using the mouse constituting the input section 161, the control section 103 sets the text input cursor in the friend list, and stores information on this setting in the RAM 105 (step S107). The process is returned to the game-1 program 201 from the friend list program 203.

The control section 103 draws the image of the game window in the frame memory 112 for image drawing in accordance with the display data regarding the game window stored in the RAM 105 at step S103 or S104. The control section 103 draws the image of the game in the frame memory 112 in accordance with the information on the display of the game stored in the RAM 105 at step S105 (step S108). The control section 103 executes a friend list drawing process to be discussed later in detail to draw the image of the friend list in the frame memory 112 for image drawing. When the friend list drawing process is executed, the friend list program 203 is called from the game-1 program 201 (step S109).

When the friend list drawing process is finished, control is returned from the friend list program 203 to the game-1 program 201. The control section 103 determines whether or not information for instructing changeover of the display mode of the game image has been passed as input information to the game-1 program 201 at step S105 (step S110). If the information for instructing the changeover of the display mode of the game image has not been passed, the process at the current frame period is terminated. As a next frame period starts, the process in FIG. 6 is executed again.

If the information for instructing the changeover of the display mode of the game image has been passed, the control section 103 refers to the RAM 105, and determines whether the display mode of the game image is set to the window mode or the full-screen mode (step S111). If the window mode is set, the control section 103 sets the display mode of the game image to the full-screen mode, and stores information on this newly set display mode in the RAM 105 (step S112). Subsequently, the process in this time's frame period is finished. If the full-screen mode has been set, the control section 103 sets the display mode of the game image to the window mode, and stores information on this newly set display mode in the RAM 105 (step S113). Subsequently, the process in this time's frame period is finished.

Figure 7:
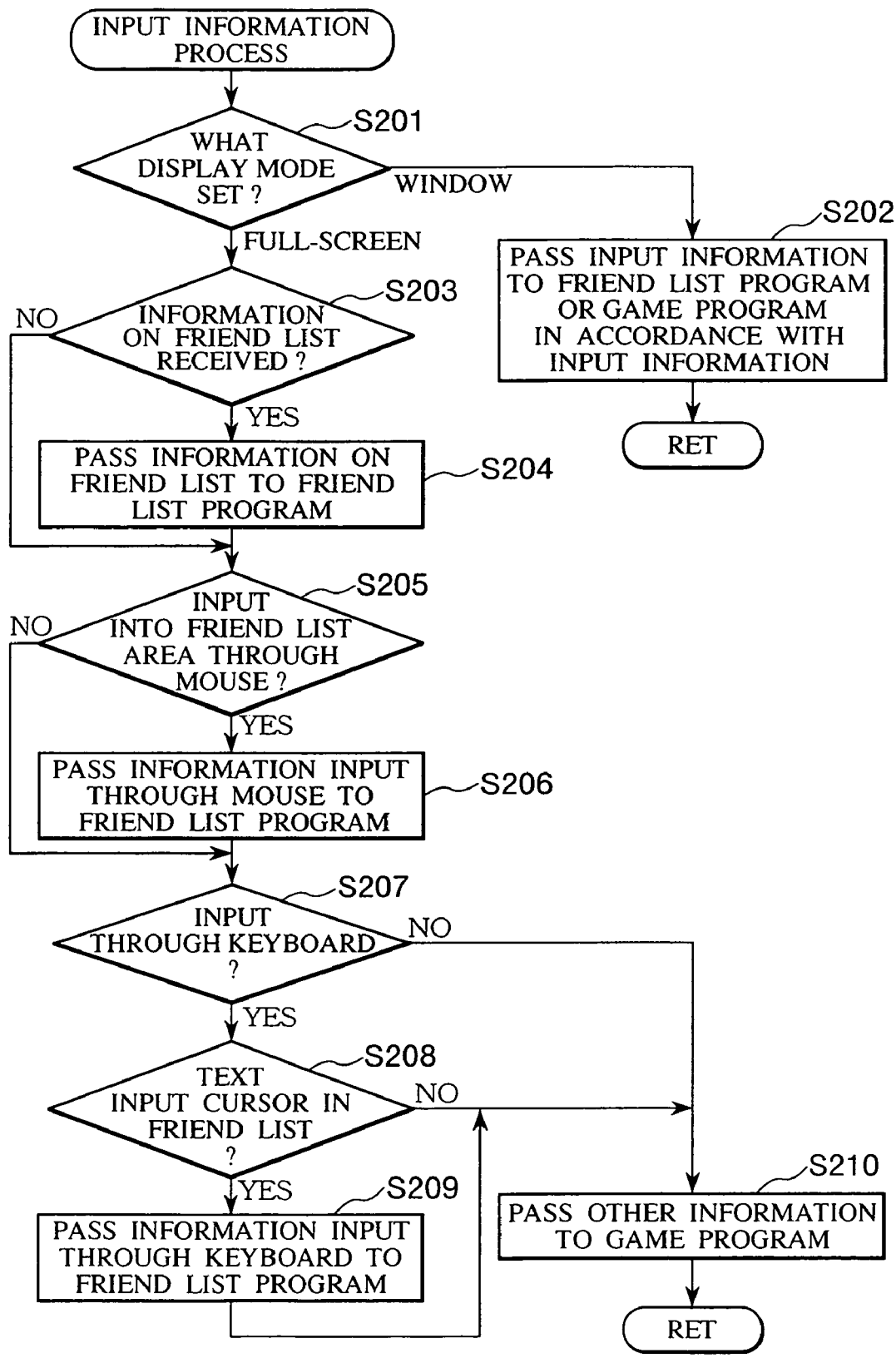
FIG. 7 is a flowchart illustrating an input information process of FIG. 6 in detail according to an embodiment of the invention.

FIG. 7 is a flowchart illustrating the input information process in the step S105 in detail. In the input information process, the control section 103 refers to the RAM 105, and determines whether the display mode of the game image is set to the window mode or the full-screen mode (step S201).

If the window mode is set, the game window 302 and the friend list window 301 are displayed on the display screen 122. The control section 103 calls up the OS 200 in the same way as done in the conventional process, separates the input information stored in the input information register of the RAM 105 for the friend list program 203 or the game-1 program 201, and passes the input information to the friend list program 203 or the game-1 program 201 (step S202). The input information process is finished, and the process returns to the flow in the flowchart of FIG. 6.

If the full-screen mode is set, the control section 103 determines whether or not the input information stored in the input information register of the RAM 105 includes information on the friend list received from the server group 2 (step S203). If the information on the friend list is not included, the process proceeds to step S205. If the information on the friend list is included, the control section 103 passes the information to the friend list program 203 (step S204). Subsequently, the process proceeds to the step S205.

At the step S205, the control section 103 determines whether or not the input information stored in the input information register of the RAM 105 includes a coordinate position which is entered using the mouse constituting the input section 161 and corresponds to the friend list area on the display screen 122. If the coordinate position corresponding to the friend list area is not included, the process proceeds to step S207. If the coordinate position corresponding to the friend list area 313 is included, the control section 103 passes the coordinate position on the display screen 122 entered by the mouse to the friend list program 203 (step S206). Subsequently, the process proceeds to step S207.

At step S207, the control section 103 determines whether or not the input information stored in the input information register of the RAM 105 includes a text code entered using the keyboard constituting the input section 161. If the text code is not included, the process proceeds to step S210. If the text code is included, the control section 103 refers to the RAM 105, and determines whether or not the text input cursor is set in the friend list (step S208). If the text input cursor is not set in the friend list, the process proceeds to step S210.

If the text input cursor is set in the friend list, the control section 103 passes the text code stored in the input information register to the friend list program 203 (step S209). Subsequently, the process proceeds to step S210. At step S210, the control section 103 passes the game-1 program 201 all those pieces of input information in the input information stored in the input information register of the RAM 105 which have not been passed to the friend list program 203. The input information process is finished, and the flow returns to the process in the flowchart of FIG. 6.

Figure 8:
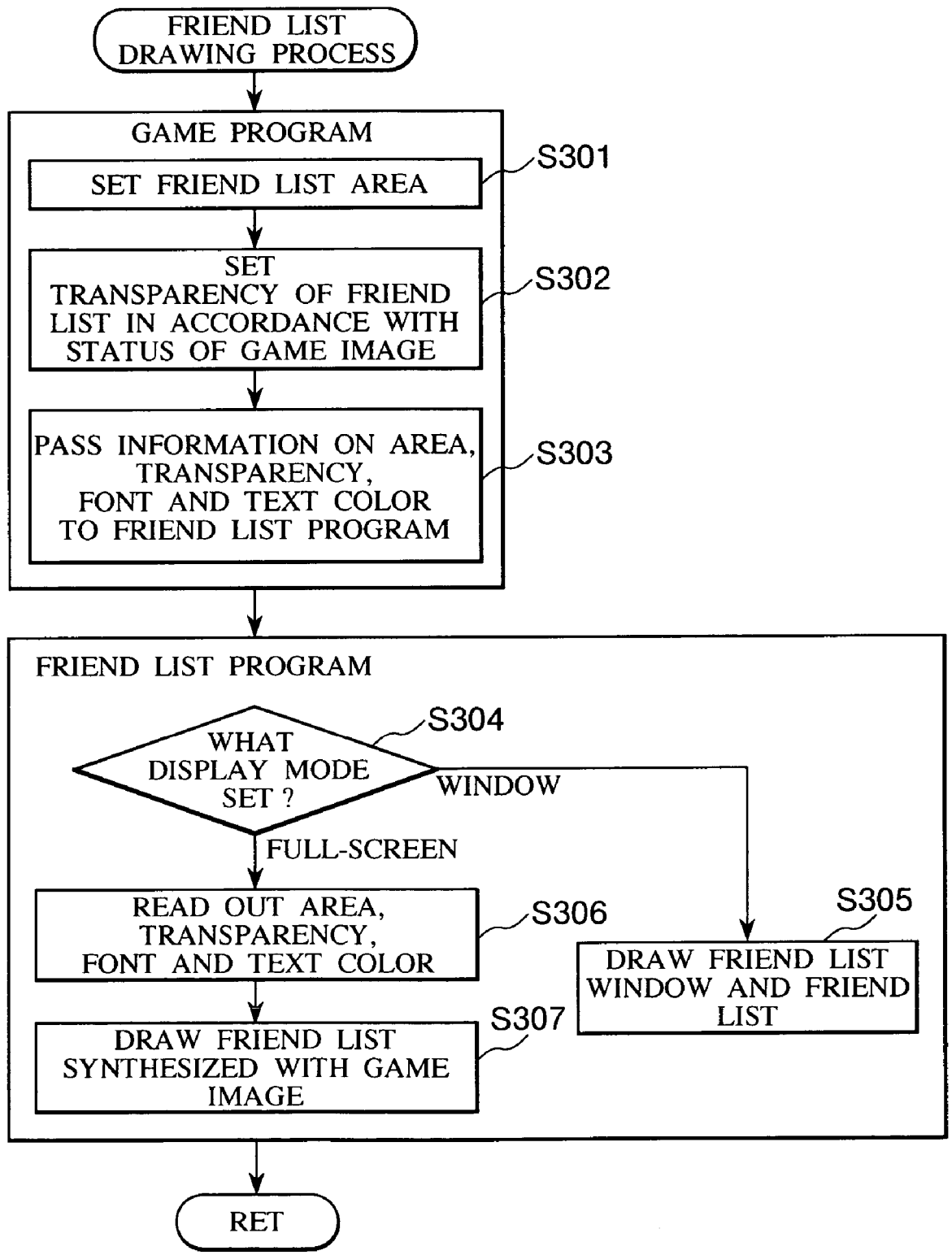
FIG. 8 is a flowchart illustrating a friend list drawing process of FIG. 6 in detail according to an embodiment of the invention.

FIG. 8 is a flowchart illustrating the friend list drawing process at step S109 in detail. In the friend list drawing process, the control section 103 executes the game-1 program 201, sets the friend list area, in which the friend list should be drawn, in a predetermined area of the frame memory 112 for image drawing, and stores information on this setting in the RAM 105 (step S301). The control section 103 sets the transparency of a semi-transparent image at the time of synthesizing the image of the friend list with the game image, in accordance with the display status of the game image in the current frame, and stores information on the transparency in the RAM 105 (step S302).

The control section 103 passes information on the friend list area set at step S301, the transparency of the semi-transparent image set at the step S302, and the font and text color of the friend list preset for the first game from the game-1 program 201 to the friend list program 203 (step S303). The game-1 program 201 then calls the friend list program 203.

As the friend list program 203 is called, the control section 103 executes the drawing module 203b, and determines whether or not the display mode of the game image is set to the window mode or the full-screen mode with reference to the RAM 105 (step S304).

If the window mode is set, the control section 103 executes the drawing module 203b to draw the image of the friend list window 301, overwriting the game image, in the frame memory 112 for image drawing based on the display data on the friend list window 301 stored in the RAM 105 at step S103. The control section 103 further draws the image of the friend list, overwriting the game image, within the frame of the friend list window 301 in the frame memory 112 for image drawing based on the display data on the friend list stored in the RAM 105 at step S107. At this time, various kinds of information passed from the game-1 program 201 at step S303 are ignored (step S305). Subsequently, the process is returned to the game-1 program 201 from the friend list program 203. The friend list drawing process is finished, and the flow returns to the process in the flowchart of FIG. 6.

If the full-screen mode is set, the control section 103 reads out the information on the font and text color of the friend list, the transparency of the semi-transparent image, and the friend list area 312, all passed to the game-1 program 201 at step S303 (step S306). The control section 103 changes the font and the text color constituting the friend list to the read-out font and text color. The control section 103 synthesizes the image of the friend list having the changed font and text color with the game image within the range of the friend list area 312, as a semi-transparent image having the read-out transparency, and draws this synthesized image in the frame memory 112 (step S307). Subsequently, the friend list drawing process is finished, and the flow returns to the process in the flowchart of FIG. 6.

In a case where only the game-1 program 201 is launched, but the friend list program 203 is not, the friend list program 203 cannot be called up from the game-1 program 201. In such a case, the game window 302 alone is set as information to be displayed at step S103. The friend list process at step S107 and the friend list drawing process at step S109 are not executed.

As explained above, in the network game system of an embodiment, when the user plays the first game or the second game, the terminal apparatus 1 obtains the friend list representing the information on other users who participate in the game, from the server group 2, and displays the friend list on the display screen 122. The terminal apparatus 1 has the game-1 program 201, the game-2 program 202, and the friend list program 203 which are independently operable from one another for the first game, the second game, and the friend list, respectively.

The game-1 program 201, the game-2 program 202, and an friend list program 203 respectively have the drawing modules 201b, 202b, and 203b, for individually drawing an image in the frame memory 112. For example, to display the friend list when the user plays the first game, the game-1 program 201 and the friend list program 203 respectively set the game window 302 and the friend list window 301.

In a case where the display mode of the first game is the window mode, after the images of the game window 303 and the first game are drawn in the frame memory 112 for image drawing by running the game-1 program 201, the friend list window 301 and the friend list are drawn in the frame memory 112 in an overwriting manner by running the friend list program 203. In a case where the display mode of the first game is the window mode, the image of the first game and the image of the friend list are respectively displayed in the corresponding windows on the display screen 122 at the same time.

In a case where the display mode of the first game is the full-screen mode, the image of the friend list overlies the image of the first game no matter where the display position of the friend list window 301 is set. If the friend list window 301 is laid over the image of the first game when the display mode of the first game is the full-screen mode, the visibility of the image of the first game is impaired. If the friend list window 301 is set behind the image of the first game, the friend list is not seen by the user.

In an embodiment, in a case where the display mode of the first game is the full-screen mode, various kinds of information on drawing of the friend list are passed to the friend list program 203 from the game-1 program 201. The drawing module 203b of the friend list program 203 draws the image of the friend list synthesized with the image of the first game in the frame memory 112 for drawing, based on the various kinds of information passed from the game-1 program 201. Accordingly, even if the display mode of the first game is the full-screen mode, the image of the friend list is displayed on the display screen 122 together with the image of the first game.

When the display mode of the first game is the window mode, even if the friend list window 301 overlies the game window 303, the user can change the size and display position of the friend list window 301 or the game window 303. In the window mode, no significant problem occurs with respect to the visibility of the image of the first game and the image of the friend list. The image of the friend list is drawn synthesized with the image of the first game in the frame memory 112 only if the display mode of the first game is the full-screen mode. In the window mode, because it is not necessary to carry out fine determination for overlay of the game window 303 and the friend list window 301, the process is simplified.

The friend list program 203, like the game-1 program 201 and the game-2 program 202, has the unique drawing module 203b. When the display mode of the first game is the window mode, the drawing module 203b of the friend list program 203 draws the friend list window 301 and the friend list in the frame memory 112 for drawing. Accordingly, when the user quits the first game and tries to play the second game, it is possible to launch the game-2 program 202 and start the second game without finishing the friend list program 203. The friend list program 203 can be shared by different games making it unnecessary to prepare different programs for the different games, so that development of programs becomes easier.

In a case where the display mode of the first game is set to the full-screen mode, an area for displaying the friend list is set, and information on that setting is passed to the friend list program 203 from the game-1 program 201. The image of the friend list is drawn within the set area in the frame memory 112. In one embodiment, the friend list is always displayed at the same position on the image of the first game, thus improving the visibility to the user. In a case where the area for displaying the friend list is set at a position where the visibility of the image of the first game is not impaired, reduction in the visibility of the image of the first game is minimized even if the image of the friend list is drawn synthesized with the image of the first game in the frame memory 112.

In a case where the display mode of the first game is the full-screen mode, the image of the friend list is drawn synthesized with the game image as the semi-transparent image, not overwritten on the image of the first game, in the frame memory 112. Accordingly, reduction in the visibility of the image of the first game originating from synthesizing and drawing the image of the friend list in the frame memory 112 is minimized. The transparency of the image of the friend list is changed in accordance with the display status of the image of the first game. The images of the first game and the friend list are displayed on the display screen 122 with well balanced visibility.

The user may enter information into the friend list as in a case of adding other users as friends to be registered. When the display mode of the first game is the full-screen mode and the image of the friend list is drawn synthesized with the image of the first game, the control section 103 determines whether or not input information from the input section 161 (particularly, positional information from the mouse and the text code from the keyboard) is for the friend list program 203.

The input information for the friend list program 203 is to be passed to the friend list program 203, so that the user does not feel it is inconvenient to enter information on the friend list even if the image of the friend list is displayed synthesized with the image of the first game. Other pieces of input information which have not been passed to the friend list are passed to the game programs 201 and 202, so that the user can progress the game appropriately in accordance with information entered from the input section 161.

The above-described effects are also achieved when the second game, not the first game, is executed as a network game.

The image of the friend list is drawn synthesized with the game image in the frame memory 112 when the first game is executed with the full-screen mode set, and when the second game is executed with the full-screen mode set. The font and text color of the friend list are set in accordance with the game program 201 or 202 that is running at this time. The font and the text color of the friend list displayed synthesized with the image of the first game can differ from those of the friend list displayed synthesized with the image of the second game. As the display status of the image of the friend list synthesized in accordance with the kind of a game is changed in this manner, the user does not feel uncomfortable with the game image originating from displaying the synthesized image of the friend list.

The invention is not limited to the above-described embodiments, and can be modified and changed in various forms. Explanations will now be given of modifications of the above-described embodiments.

In the above-described embodiments, when the display mode of the game image is set to the full-screen mode, the image of the friend list is drawn synthesized with the image of the game in the frame memory 112. Even if the display mode of the game image is set to the window mode, when the friend list window 301 is set to overlay the game window 303, the image of the friend list may be drawn synthesized with the game image in the frame memory 112 without drawing the friend list window 301 therein.

The image of the friend list may be drawn synthesized with the game image in the frame memory 112 only when the entire friend list window 301 overlies the game window 303. When a predetermined percentage (for example, 50%) of the friend list 301 or a greater percentage thereof overlies the game window 303, the image of the friend list may be drawn in the frame memory 112 synthesized with the game image. If even a part of the friend list window 301 overlies the game window 303, the image of the friend list 301 may be drawn synthesized with the game image in the frame memory 112.

In the above-described embodiments, in a case where the display mode of the game image is set to the full-screen mode, the image of the friend list is drawn in the friend list area set at a predetermined area on the display screen 122. The image of the friend list may be drawn in that area where the friend list 301 is originally set. In this case, depending on the position of the friend list window 301, as the image of the friend list overlies the game image, the visibility of the game image may become extremely poor. In this case, the display position of the friend list window 301 may be changed. After the display data on the friend list with the changed display position is stored in the RAM 105, the image of the friend list may be drawn synthesized with the game image in the frame memory 112.

In the above-described embodiments, when the friend list is drawn synthesized with the game image in the frame memory 112, the font and text color of the friend list are changed by the game program 201 or 202. In a case where, for example, a character is included in the friend list, however, the kinds of the character in the friend list may be changed by the game program 201 or 202. The image of the friend list may be changed according to a game in play, as long as the contents of the friend list are not impacted.

In the above-described embodiments, explanation has been given of the case where the image of the first game or the second game as the network game and the image of the friend list used in the network game are displayed on the display screen 122 at the same time. The invention is, however, not limited to this case, and may be applied to, for example, a case where the image of an advertisement regularly sent from the server group 2 is displayed on the display screen 122 together with the image of the network game in play.

The image of the advertisement may be displayed on the display screen 122 by receiving advertisement information from the server group 2 regardless of the operation by the user. Input information from the input section 161 may be disregarded when the terminal apparatus 1 displays the advertisement information. The terminal apparatus 1 may display the advertisement information with the same contents during a period from receiving advertisement information from the server group 2 to receiving next advertisement information, and need not process advertisement information every frame period. When movement of an advertisement window for displaying the advertisement information is instructed, the position of drawing the image of the advertisement information may be changed.

In this embodiment, a sub-frame memory for temporarily drawing the image of the advertisement information and that of the advertisement window as a frame of the image of the advertisement information, is prepared in addition to the frame memories 112. In the sub-frame memory, image data written in a pixel, where no image of the advertisement information and no image of the advertisement window are drawn, is "NULL" indicating that no image data is written. The terminal apparatus 1 executes the advertisement information received from the server group 2, and runs an advertisement program for drawing an image in the sub-frame memory, together with the game program.

Figure 9:
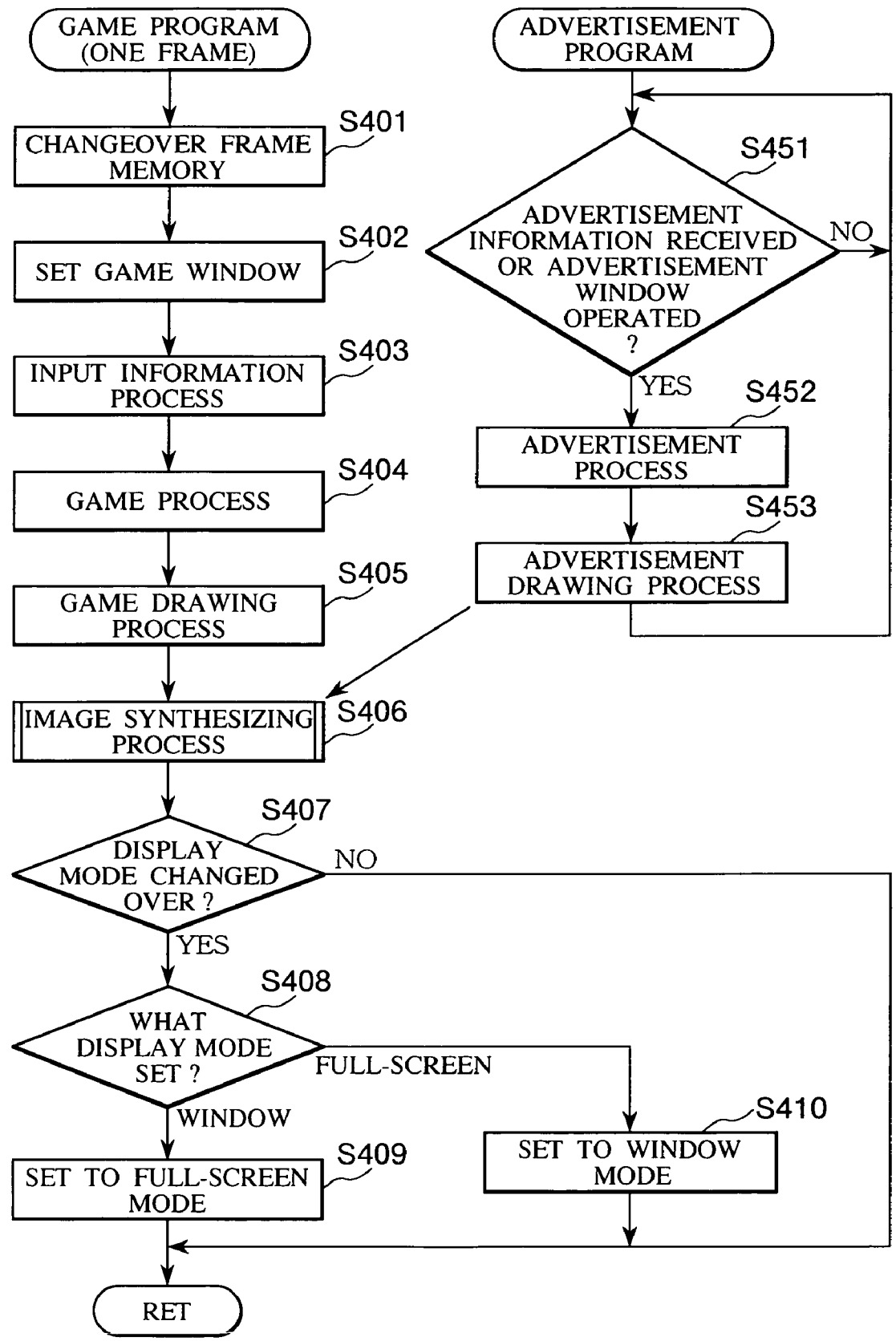
FIG. 9 is a flowchart illustrating processes to be executed by the controller of the terminal apparatus according to an embodiment of the invention.

FIG. 9 is a flowchart illustrating a process to be executed by the control section 103 of the terminal apparatus 1. In this embodiment, a process by the game program and a process by the advertisement program are executed in parallel. In the process by the advertisement program, the control section 103 determines whether or not advertisement information received from the server group 2 or operation information for the advertisement window is included in input information which has not been processed by the game program, but passed to the advertisement program (step S451). If neither the advertisement information nor the operation information is included in the input information, the process at step S451 is repeated. An image drawn in the sub-frame memory remains unchanged.

If the operation information is included in the input information, the control section 103 updates information on the frame of the advertisement window stored in the RAM 105 in accordance with the operation information. Inclusion of the operation information means that any operation with respect to the advertisement window was possible, so that the display mode of the game image is the window mode. The control section 103 stores display data on the frame of the advertisement window in the RAM 105. If the advertisement information received from the server group 2 is included in the input information, the control section 103 stores display data on the advertisement information in the RAM 105 (step S452).

The control section 103 draws the advertisement window and the image of the advertisement information in the sub-frame memory in accordance with the display data stored in the RAM 105 at step S452 (step S453). The process returns to step S451, and the similar process is continued.

In the process by the game program, the control section 103 changes over the frame memory 112 for drawing in the previous frame period to the frame memory 112 for readout at the current frame period, and changes over the frame memory 112 for readout in the previous frame period to the frame memory 112 for drawing at the current frame period (step S401). The graphics processor 111 generates video signals by sequentially reading out images drawn in the previous frame period from the frame memory 112 changed over for readout, and outputs the generated video signals to the display apparatus 121.

When the window mode is set, the control section 103 checks whether or not information on display of the game window 302 (information on the display position and display status of the window frame) is retrieved as input information. If the information on the display of the game window is retrieved, the control section 103 updates information on the display of the game window 302 stored in the RAM 105. The control section 103 stores display data on the display position and display status of the window frame of the game window 302 in the RAM 105 separately from the information on the display of the game window 302.

When the full-screen mode is set, the control section 103 checks whether or not information on a frame for full-screen display (which may be called "game window" for the sake of convenience) is retrieved as input information. If the information on the game window is retrieved, the control section 103 updates information on the game window stored in the RAM 105. The control section 103 stores display data on the display status of the game window in the RAM 105 (step S402).

The control section 103 executes an input information process of retrieving input information stored in the input information register of the RAM 105 (step S403). The control section 103 executes various processes of progressing the game in accordance with the retrieved input information and processing results up to the previous frame, and stores display data on the display of the game obtained by the processing results in the RAM 105. If there is input information (including advertisement information sent from the server group 2) which has not been processed by the game program, the control section 103 discards the non-processed input information (step S404).

The control section 103 draws the image of the game window in the frame memory 112 for image drawing in accordance with the display on the game window stored in the RAM 105 at step S402. The control section 103 draws the game image in the frame memory 112 for image drawing in accordance with the display data on the display of the game stored in the RAM 105 at step S404 (step S405). The control section 103 executes an image synthesizing process to be discussed later in detail, and draws an image of an advertisement drawn in the sub-frame memory in the frame memory 112 for image drawing (step S406).

After the image synthesizing process is finished, the control section 103 determines whether or not information which instructs changeover of the display mode of the game image is retrieved as the input information at step S403 (step S407). If the information of instructing the changeover of the display mode of the game image is not retrieved, the process in the current frame period is finished. When the next frame period starts, the process of the game program in the flowchart of FIG. 9 is carried out again.

If the information instructing the changeover of the display mode of the game image is retrieved, the control section 103 refers to the RAM 105, and determines whether the display mode of the game image is set to the window mode or the full-screen mode (step S408). If the window mode is set, the control section 103 sets the display mode of the game image to the full-screen mode, and stores information on this newly set display mode in the RAM 105 (step S409). Subsequently, the process in the current frame period is finished. If the full-screen mode is set, the control section 103 sets the display mode of the game image to the window mode, and stores information on this newly set display mode in the RAM 105 (step S410). Subsequently, the process at the current frame period is finished.

Figure 10:
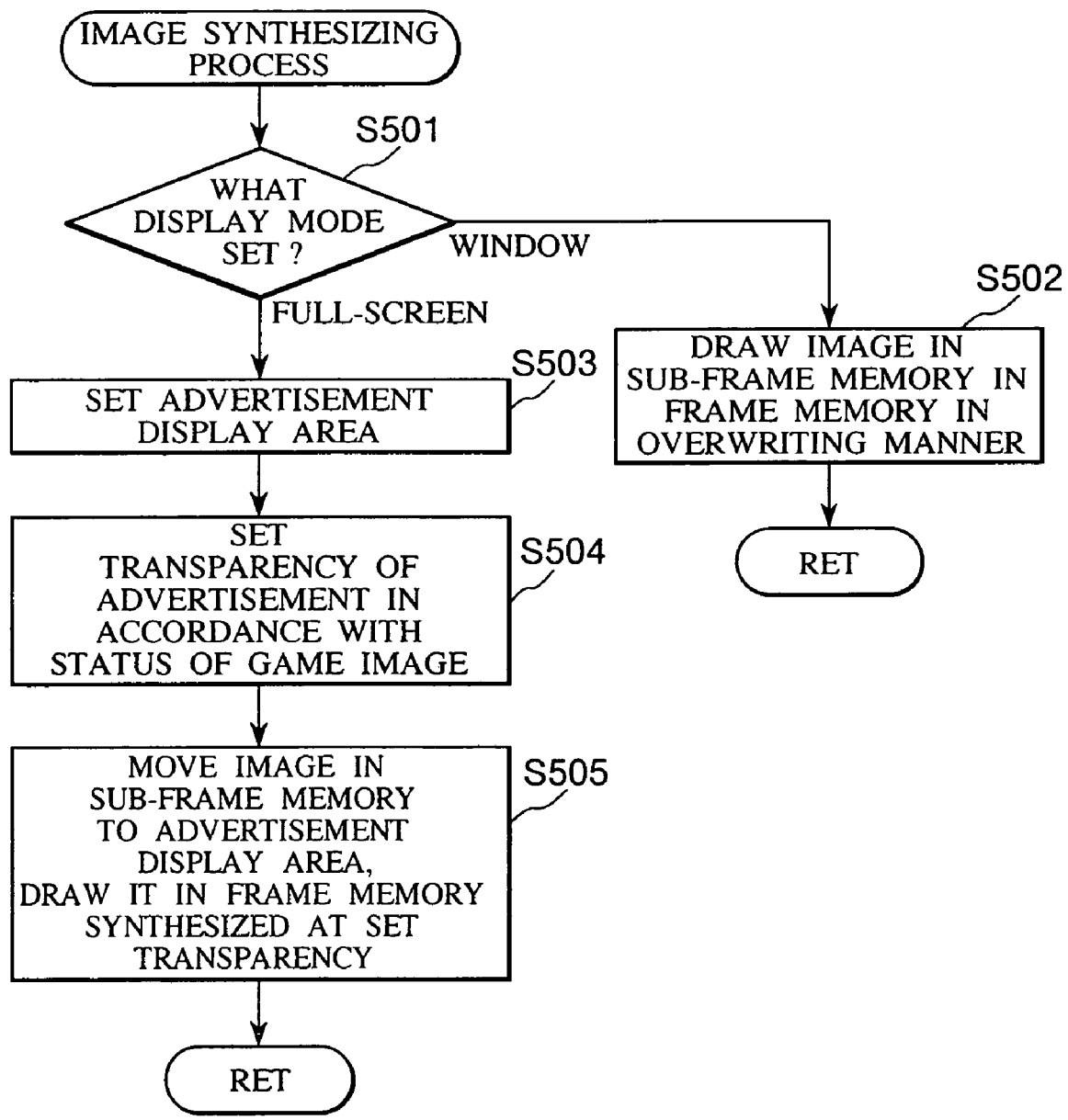
FIG. 10 is a flowchart illustrating the screen synthesizing process of FIG. 9 in detail according to an embodiment of the invention.

FIG. 10 is a flowchart illustrating the image synthesizing process at step S406 in detail. In the image synthesizing process, the control section 103 determines whether the display mode of the game image is set to the window mode or the full-screen mode referring to the RAM 105 (step S501).

If the window mode is set, the control section 103 overwrites the image of the advertisement drawn in the sub-frame memory at the step S453 on the game image drawn at the step S404, and draws that overwritten image in the frame memory 112 (step S502). The image synthesizing process is finished, and the flow returns to the process illustrated in the flowchart of FIG. 9.

If the full-screen mode is set, the control section 103 sets an area for drawing the advertisement in a predetermined area in the frame memory 112 for image drawing, and stores information on this setting in the RAM 105 (step S503). The control section 103 sets the transparency at the time of synthesizing the advertisement image with the game image, in accordance with the display status of the game image at the current frame, and stores the set transparency in the RAM 105 (step S504).

The control section 103 moves the advertisement image drawn in the sub-frame memory at step S453 to the area for drawing the advertisement set at step S503, and draws the advertisement image synthesized with the game image in the frame memory 112 for image drawing as a semi-transparent image with the transparency set at step S503 (step S505). The image synthesizing process is finished, and the flow returns to the process illustrated in the flowchart of FIG. 9.

An image displayed in a separate window if the display mode of the game image is the window mode, or displayed synthesized with the game image if the display mode is the full-screen mode, is not limited to the image of the friend list or the advertisement. It may be an image of a GM (Game Master) call, a mail, a user verification, information on how to clear the game, a message board, an FAQ, and the like. Images which can be displayed together with the game image are displayed according to entry of information by the user, except for an image on the information on how to clear the game sent from the server group 2 to the terminal apparatus 1 as needed. The information on how to clear the game may be supplied in accordance with an instruction entered by the user. Accordingly, even if an image of the information sent from the server group 2 is displayed together with the game image, an embodiment illustrated in FIGS. 9 and 10 is not applicable to displaying the image of such information which requires entry by the user.

A GM call is a function of transmitting a request of troubleshooting from the user to a support center when the user is interfered with by other users or trouble happens among the users. The user enters the contents of a trouble (including information on the other user who caused the trouble) through the input section 161, and the terminal apparatus 1 sends the entered contents of the trouble to the server group 2 along with the account of the user of the terminal apparatus 1. A support staff member reads the information sent from the terminal apparatus 1, and responds to the trouble. Accordingly, the GM call can be information used in place of the friend list.

A mail is received and transmitted from and to multiple terminal apparatuses 1 to allow a user to contact other users or to be contacted from other users, while executing a game. A mailer can be information used in place of the friend list. The user cannot play a network game by merely launching the game program, and needs to be verified by the management server 21. The user enters his/her account and password in accordance with a user verification screen through the input section 161, and sends them to the management server 21 of the server group 2 from the terminal apparatus 1 for user verification. The user verification screen can be substituted for the friend list.

The message board is for exchanging information among unspecified users while a user is playing the game, and can be substituted for the friend list. The FAQ is such that as a user enters (selects) a question when a question arises, an answer to that question is sent from the server group 2. The FAQ can be substituted for the friend list. The information on how to clear the game is to be received from the server group 2 when a user is not sure how to clear the game, and can also be substituted for the friend list.

In the above-described embodiments, the image of the friend list is drawn synthesized with the game image in the frame memory 112 for image drawing by running the friend list program 203 when the display mode of the game image is set to both the window mode and full-screen mode. However, the area in which the friend list is drawn in the full-screen mode is within the display area of the game image. The image of the friend list may be drawn synthesized with the game image in the frame memory 112 for image drawing by running the game program 203 when the display mode of the game image is set to the full-screen mode.

Figure 11:
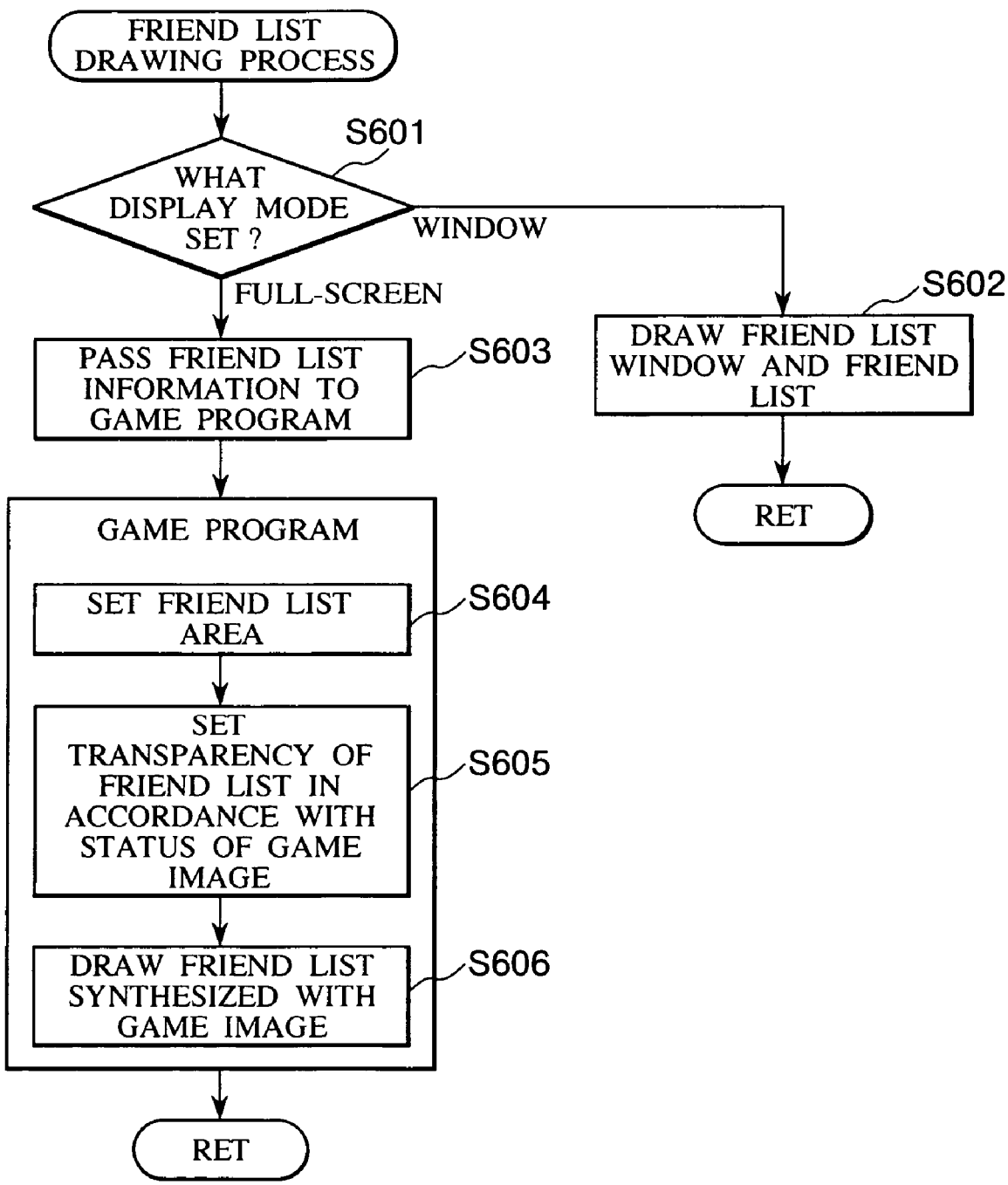
FIG. 11 is a flowchart illustrating a friend list drawing process according to an embodiment of the invention.

FIG. 11 is a flowchart illustrating the friend list drawing process at step S109. In the friend list drawing process in this embodiment, the control section 103 runs the friend list program 203, and determines whether the display mode of the game image is set to the window mode or full-screen mode referring to the RAM 105 (step S601).

If the window mode is set, the control section 103 overwrites the image of the friend list window 301 on the game image and draws that image in the frame memory 112 for image drawing based on the display data on the friend list window 301 stored in the RAM 105 at step S103 by running the drawing module 203b of the friend list program 203. The control section 103 overwrites the image of the friend list on the game image within the range in the frame of the friend list window 301, and draws that image in the frame memory 112 for image drawing based on the display data on the friend list stored in the RAM 105 at step S107 (step S602). Subsequently, the process returns to the game-1 program 201 from the friend list program 203. The friend list drawing process is finished, and the flow returns to the process illustrated in the flowchart of FIG. 6.

If the full-screen mode is set, the control section 103 passes the display data on the friend list, stored in the RAM 105 at step S107, to the game-1 program 201 from the friend list program 203, and calls up the game-1 program 201 from the friend list program 203 (step S603).

The control section 103 runs the game-1 program 201, and sets the friend list area for drawing the friend list in a predetermined area in the frame memory 112 for image drawing (step S604). The control section 103 sets the transparency of a semi-transparent image at the time of synthesizing the image of the friend list with the game image in accordance with the display status of the game image in the current frame, and stores the set transparency in the RAM 105 (step S605).

The control section 103 changes the font and text color of the friend list in the display data on the friend list passed from the friend list program 203 at step S603, into the font and text color set for the first game. The control section 103 synthesizes the image of the friend list with the changed font and text color within the friend list area in the frame memory 112 for image drawing at the transparency set at step S605, and draws the resulting image (step S606). The friend list drawing process is finished, and then the flow returns to the process in the flowchart of FIG. 6.

In the above-described embodiments, the drawing modules 201b, 202b of the game-1 program 201 and the game-2 program 202 execute the processes of drawing the window frames of the game windows 302, 303 (or the frame in case of the full-screen display). The drawing module 203b of the friend list program 203 executes the process of drawing the window frame of the friend list 301 (which is in the case where the display mode of the game image is set to the window mode). Such processes of drawing the window frames may be realized by the functions of the OS 200, and the drawing modules 201b, 202b, and 203b may be simply for executing processes of drawing the game image or the friend list image.

In the above-described embodiments, the explanation has been given of the example where a network game which is executed by the system comprising the terminal apparatuses 1 and the server group 2 connected together over the Internet 3. The invention is, however, applicable to a stand-alone type machine as long as the game image is displayed on the same display apparatus together with an image showing other information. The invention can be applied not only to a case where the game image and the image of the friend list are displayed, but also a case where first information (information corresponding to the game image, for example, an image of a movie) and second information (corresponding to the friend list) are displayed on the same display apparatus.

In the above-described embodiments, a video game machine or a general-purpose personal computer is used as the terminal apparatus 1. However, a portable game machine structured to house the display apparatus 121 in the same casing may be used if this game machine has the similar structural components as those of a video game main body 101 and has the Internet-connection capability. A cellular phone may also be used. A semiconductor memory card may be used as the recording medium 131, in place of a DVD-ROM or a CD-ROM.

In the above-described embodiments, the programs and data of the terminal apparatus 1 are distributed and stored in the recording medium 131. A semiconductor memory card may be used as the recording medium 131, in place of a DVD-ROM or a CD-ROM. In this case, a computer apparatus used as a platform heeds to have a card slot for inserting the memory card, in place of the DVD/CD-ROM drive 113. The programs and data according to the invention may be stored in the HDD 107 beforehand, and provided in that form. The recording medium for storing and providing the programs and data may be of any type which matches with the physical configuration of hardware and the distribution form.

The programs and data according to the embodiments may be stored in a fixed disk device of a server apparatus on the Internet 3. The server apparatus converts the programs stored in the fixed disk apparatus into signals, superimposes those signals on a carrier wave, and distributes that carrier wave over the Internet 3 in accordance with a request from a computer apparatus like the terminal apparatus 1. For example, in the terminal apparatus 1, the programs and data received by the communications interface 115 from the server apparatus are stored in the HDD 107, and are loaded to the RAM 105 at the time of execution. Server apparatuses which provide the programs and data may be the servers 21 to 24 of the server group 2 in the embodiments, or may be prepared separately from the server group 2.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

What is claimed is:

1. A data display control method of drawing an image according to results of independently processed first information and second information in a frame memory and displaying the drawn image on a display apparatus, comprising:
   processing the first information to generate first display data for displaying the result of processing the first information;
   processing the second information to generate second display data for displaying the result of processing the second information;
   setting a first window for displaying an image of the first display data on said display apparatus;
   setting a second window for displaying an image of the second display data on said display apparatus;
   drawing the image of the first display data within a range in said frame memory corresponding to the first window;
   determining whether the second window is set to overlay the first window;
   drawing the image of the second display data within a range in said frame memory corresponding to the second window, when it is determined that the second window is not set to overlay the first window;
   drawing the image of the second display data synthesized with the image of the first display data within the range in said frame memory corresponding to the first window, when it is determined that the second window is set to overlay the first window; and
   reading out an image drawn in said frame memory, and outputting the read-out image to said display apparatus,
   wherein when it is determined that the second window is set to overlay the first window, the image of the second window is not drawn in said frame memory,
   wherein the first window is set in an entire screen area of said display apparatus or a part of the screen area in accordance with a selection of whether to set the first window in the entire screen area of said display apparatus or the part of the screen area, and it is determined that the second window is set to overlay the first window when the first window is set in the entire screen area or is set in the part of the screen area, and
   wherein the second display data includes a friend list, and at least one of a font and a transparency of the friend list changes based on changing from a first game application to a second game application.

2. The data display control method of controlling information display according to claim 1, wherein when it is determined that the second window is set to overlay the first window, the image of the second display data is drawn synthesized with the image of the first display data within a range in said frame memory corresponding to a predetermined specific area in the first window.

3. The data display control method according to claim 1, wherein when it is determined that the second window is set to overlay the first window, the second window is reset to a predetermined specific area in the first window, and the image of the second display data is drawn synthesized with the image of the first display data within a range corresponding to the second window reset to the predetermined specific area.

4. The data display control method according to claim 1, wherein when it is determined that the second window is set to overlay the first window, the image of the second display data is drawn synthesized with the image of the first display data as a semi-transparent image in said frame memory.

5. The data display control method according to claim 4, further comprising:
   determining, when it is determined that the second window is set to overlay the first window, a display status of the image of the first display data prior to drawing the image of the second display data; and
   setting a transparency of the image of the second display data in accordance with the display status of the image of the first display data,
   wherein the image of the second display data is drawn synthesized with the image of the first display data as a semi-transparent image at the set transparency in said frame memory.

6. The data display control method according to claim 1, further comprising:

determining, when positional information is input from a positional-information input apparatus when the image of the second display data is drawn synthesized with the image of the first display data, whether positional information indicating a desired position on said display apparatus corresponds to the first information or the second information based on a position where the image of the second display data is displayed;

passing the positional information to the first information when it is determined that the input positional information corresponds to the first information; and passing the positional information to the second information when it is determined that the input positional information corresponds to the second information.

7. The data display control method according to claim 1, further comprising:

determining, when text information is input from a text-information input apparatus when the image of the second display data is drawn synthesized with the image of the first display data, whether a cursor indicating an input position of text information is set in a position of the second display data;

passing the input text information to the first window when it is determined that the cursor is not set in the position of the second display data; and passing the input text information to the second window when it is determined that the cursor is set in the position of the second display data.

8. The data display control method according to claim 1, wherein a plurality of types of first information are processable, the first display data being generated based upon the type of first information that is processed.

9. The data display control method according to claim 8, wherein when it is determined that the second window is set to overlay the first window, the image of the second display data is drawn synthesized with the image of the first display data in said frame memory in accordance with the type of first information to be processed.

10. The data display control method according to claim 1, further comprising:

drawing the image of the second display data in a sub frame memory prepared separately from said frame memory;

drawing the image from said sub frame memory to said frame memory having the image of the first display data drawn therein by overwriting when it is determined that the second window is not set to overlay the first window; and drawing the image drawn in said sub frame memory synthesized with the image of the first display data within a range in said frame memory corresponding to the first window when it is determined that the second window is set to overlay the first window.

11. The data display control method according to claim 10, wherein the image of the second display data is drawn in said sub frame memory at a predetermined timing, and the image of the first display data and the image of the second display data are drawn in said frame memory in every period that is a multiple of one field period or in every period that is a multiple of one frame period.

12. A data display control apparatus which is connected to a display apparatus for displaying an image, has a frame memory where images according to results of independently processed first information and second information are drawn, and displays the images drawn in said frame memory on said display apparatus, said data display control apparatus comprising:

a first-information generator which processes the first information, and generates first display data for displaying the result of processing the first information;

a second-information generator which processes the second information, and generates second display data for displaying the result of processing the second information; and a display controller which individually draws an image of the first display data and an image of the second display data in said frame memory, and displays the images on said display apparatus, said display controller including:

a first-window setter which sets a first window for displaying the first display data on said display apparatus, a second-window setter which sets a second window for displaying the second display data on said display apparatus, a first-display-data drawer which draws the image of the first display data within a range in said frame memory corresponding to the first window, an overlay determiner which determines whether the second window is set to overlay the first window, a non-overlay-second-display-data drawer which draws the image of the second display data within a range in said frame memory corresponding to the second window when said overlay determiner determines that the second window is not set to overlay the first window, an overlay-second-display-data drawer which draws the image of the second display data synthesized with the image of the first display data in said frame memory within the range corresponding to the first window when said overlay determiner determines that the second window is set to overlay the first window, and an image display controller which reads out an image drawn in said frame memory and displays the read-out image on said display apparatus, wherein when it is determined that the second window is set to overlay the first window, the image of the second window is not drawn in said frame memory, wherein the first window is set in an entire screen area of said display apparatus or a part of the screen area in accordance with a selection of whether to set the first window in the entire screen area of said display apparatus or the part of the screen area, and it is determined that the second window is set to overlay the first window when the first window is set in the entire screen area of said display apparatus, wherein the second display data is displayed at the same position on said display apparatus regardless of whether the first window is set in the entire screen area or is set in the part of the screen area, and wherein the second display data includes a friend list, and at least one of a font and a transparency of the friend list changes based on changing from a first game application to a second game application.

13. A data display control apparatus which is connected to a display apparatus for displaying an image, has a frame memory where images according to results of independently processed first information and second information are drawn, and displays the images drawn in said frame memory on said display apparatus, said data display control apparatus comprising:

a first information processor which processes the first information, and draws an image of first display data obtained by processing the first information in said frame memory;

a second information processor which processes the second information, and draws an image of second display data obtained by processing the second information in said frame memory; and an image display controller which reads out an image drawn in said frame memory and displays the read-out image on said display apparatus, said first information processor including:

a first-window setter which sets a first window for displaying the first display data on said display apparatus, and a first-display-data drawer which draws the image of the first display data within a range in said frame memory corresponding to the first window, said second information processor including:

a second-window setter which sets a second window for displaying the second display data on said display apparatus, an overlay determiner which determines whether the second window is set to overlay the first window;

a non-overlay-second-display-data drawer which draws the image of the second display data within a range in said frame memory corresponding to the second window when said overlay determiner determines that the second window is not set to overlay the first window, and a second-display-data forwarder which forwards the second display data to said first information processor when said overlay determiner determines that the second window is set to overlay the first window, said first information processor further including an overlay-second-display-data drawer which draws the image of the second display data synthesized with the image of the first display data in said frame memory within the range corresponding to the first window when the second display data is received from said second-display-data forwarder, wherein when it is determined that the second window is set to overlay the first window, the image of the second window is not drawn in said frame memory, wherein the first window is set in an entire screen area of said display apparatus or a part of the screen area in accordance with a selection of whether to set the first window in the entire screen area of said display apparatus or the part of the screen area, and it is determined that the second window is set to overlay the first window when the first window is set in the entire screen area of said display apparatus, wherein the second display data is displayed at the same position on said display apparatus regardless of whether the first window is set in the entire screen area or is set in the part of the screen area, and wherein the second display data includes a friend list, and at least one of a font and a transparency of the friend list changes based on changing from a first game application to a second game application.

14. A data display control apparatus which is connected to a display apparatus for displaying an image, has a frame memory where images according to results of independently processed first information and second information are drawn, and displays the images drawn in said frame memory on said display apparatus, said data display control apparatus comprising:

a first information processor which processes the first information, and draws an image of first display data obtained by processing the first information in said frame memory;

a second information processor which processes the second information, and draws an image of second display data obtained by processing the second information in said frame memory; and an image display controller which reads out an image drawn in said frame memory and displays the read-out image on said display apparatus, said first information processor including:

a first-window setter which sets a first window for displaying the first display data on said display apparatus, and a first-display-data drawer which draws the image of the first display data within a range in said frame memory corresponding to the first window, said second information processor including:

a second-window setter which sets a second window for displaying the second display data on said display apparatus, an overlay determiner which determines whether the second window is set to overlay the first window, a non-overlay-second-display-data drawer which draws the image of the second display data within a range in said frame memory corresponding to the second window when said overlay determiner determines that the second window is not set to overlay the first window, and an overlay-second-display-data drawer which draws the image of the second display data synthesized with the image of the first display data in said frame memory within the range corresponding to the first window when said overlay determiner determines that the second window is set to overlay the first window, wherein when it is determined that the second window is set to overlay the first window, the image of the second window is not drawn in said frame memory, wherein the first window is set in an entire screen area of said display apparatus or a part of the screen area in accordance with a selection of whether to set the first window in the entire screen area of said display apparatus or the part of the screen area, and it is determined that the second window is set to overlay the first window when the first window is set in the entire screen area of said display apparatus, and wherein the second display data is displayed at the same position on said display apparatus regardless of whether the first window is set in the entire screen area or is set in the part of the screen area, and wherein the second display data includes a friend list, and at least one of a font and a transparency of the friend list changes based on changing from a first game application to a second game application.

15. A data display control apparatus which is connected to a display apparatus for displaying an image, comprises a program memory for storing a program, a processor for executing said program, and a frame memory for drawing images according to results of independently processed first information and second information, and displays an image drawn in said frame memory on said display apparatus, said program including:

a first-display-data generating code section which processes the first information to generate first display data for displaying the result of processing the first information;

a second-display-data generating code section which processes the second information to generate second display data for displaying the result of processing the second information;

a first-window setting code section which sets a first window for displaying an image of the first display data on said display apparatus;

a second-window setting code section which sets a second window for displaying an image of the second display data on said display apparatus;

a first-display-data image drawing code section which draws the image of the first display data within a range in said frame memory corresponding to the first window;

a determining code section which determines whether the second window is set to overlay the first window;

a second-display-data image drawing code section which draws the image of the second display data within a range in said frame memory corresponding to the second window, when it is determined that the second window is not set to overlay the first window;

a second-display-data image synthesizing and drawing code section which draws the image of the second display data synthesized with the image of the first display data within the range in said frame memory corresponding to the first window, when it is determined that the second window is set to overlay the first window; and an outputting code section which reads out an image drawn in said frame memory, and outputs the read-out image to said display apparatus, wherein when it is determined that the second window is set to overlay the first window, the image of the second window is not drawn in said frame memory, wherein the first window is set in an entire screen area of said display apparatus or a part of the screen area in accordance with a selection of whether to set the first window in the entire screen area of said display apparatus or the part of the screen area, and it is determined that the second window is set to overlay the first window when the first window is set in the entire screen area of said display apparatus, and wherein the second display data is displayed at the same position on said display apparatus regardless of whether the first window is set in the entire screen area or is set in the part of the screen area, and wherein the second display data includes a friend list, and at least one of a font and a transparency of the friend list changes based on changing from a first game application to a second game application.

16. A non-transitory computer readable recording medium storing a program which is executed by a computer apparatus connected to a display apparatus for displaying an image and comprising a program memory for storing said program, a processor for executing said program, and a frame memory for drawing images according to results of independently processed first information and second information, and displays an image drawn in said frame memory on said display apparatus, said program including:

a first-display-data generating code section which processes the first information to generate first display data for displaying the result of processing the first information;

a second-display-data generating code section which processes the second information to generate second display data for displaying the result of processing the second information;

a first-window setting code section which sets a first window for displaying an image of the first display data on said display apparatus;

a second-window setting code section which sets a second window for displaying an image of the second display data on said display apparatus;

a first-display-data image drawing code section which draws the image of the first display data within a range in said frame memory corresponding to the first window;

a determining code section which determines whether the second window is set to overlay the first window;

a second-display-data image drawing code section which draws the image of the second display data within a range in said frame memory corresponding to the second window, when it is determined that the second window is not set to overlay the first window;

a second-display-data image synthesizing and drawing code section which draws the image of the second display data synthesized with the image of the first display data within the range in said frame memory corresponding to the first window, when it is determined that the second window is set to overlay the first window; and an outputting code section which reads out an image drawn in said frame memory, and outputs the read-out image to said display apparatus, wherein when it is determined that the second window is set to overlay the first window, the image of the second window is not drawn in said frame memory, wherein the first window is set in an entire screen area of said display apparatus or a part of the screen area in accordance with a selection of whether to set the first window in the entire screen area of said display apparatus or the part of the screen area, and it is determined that the second window is set to overlay the first window when the first window is set in the entire screen area of said display apparatus, and wherein the second display data is displayed at the same position on said display apparatus regardless of whether the first window is set in the entire screen area or is set in the part of the screen area, and wherein the second display data includes a friend list, and at least one of a font and a transparency of the friend list changes based on changing from a first game application to a second game application.

17. A non-transitory hardware device embodying a carder wave superimposed with data signals of a program which is executed by a computer apparatus connected to a display apparatus for displaying an image and comprising a program memory for storing said program, a processor for executing said program, and a frame memory for drawing images according to results of independently processed first information and second information, and displays an image drawn in said frame memory on said display apparatus, said program including:

a first-display-data generating code section which processes the first information to generate first display data for displaying the result of processing the first information;

a second-display-data generating code section which processes the second information to generate second display data for displaying the result of processing the second information;

a first-window setting code section which sets a first window for displaying an image of the first display data on said display apparatus;

a second-window setting code section which sets a second window for displaying an image of the second display data on said display apparatus;

a first-display-data image drawing code section which draws the image of the first display data within a range in said frame memory corresponding to the first window;

a determining code section which determines whether the second window is set to overlay the first window;

a second-display-data image drawing code section which draws the image of the second display data within a range in said frame memory corresponding to the second window, when it is determined that the second window is not set to overlay the first window;

a second-display-data image synthesizing and drawing code section which draws the image of the second display data synthesized with the image of the first display data within the range in said frame memory corresponding to the first window, when it is determined that the second window is set to overlay the first window; and an outputting code section which reads out an image drawn in said frame memory, and outputs the read-out image to said display apparatus, wherein when it is determined that the second window is set to overlay the first window, the image of the second window is not drawn in said frame memory, wherein the first window is set in an entire screen area of said display apparatus or a part of the screen area in accordance with a selection of whether to set the first window in the entire screen area of said display apparatus or the part of the screen area, and it is determined that the second window is set to overlay the first window when the first window is set in the entire screen area of said display apparatus, and wherein the second display data is displayed at the same position on said display apparatus regardless of whether the first window is set in the entire screen area or is set in the part of the screen area, and wherein the second display data includes a friend list, and at least one of a font and a transparency of the friend list changes based on changing from a first game application to a second game application.

* * * * *